United States Patent
Tokuma

(12) 
(10) Patent No.: US 11,518,634 B2
(45) Date of Patent: Dec. 6, 2022

(54) READING APPARATUS AND IMAGE FORMING SYSTEM

(71) Applicant: CANON KABUSHIKI KAISHA, Tokyo (JP)

(72) Inventor: Naoto Tokuma, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/553,262

(22) Filed: Dec. 16, 2021

(65) Prior Publication Data

US 2022/0234850 A1 Jul. 28, 2022

(30) Foreign Application Priority Data

Jan. 27, 2021 (JP) .............................. JP2021-010831

(51) Int. Cl.
*B65H 5/06* (2006.01)
*H04N 1/40* (2006.01)
*H04N 1/00* (2006.01)

(52) U.S. Cl.
CPC ......... *B65H 5/062* (2013.01); *H04N 1/00602* (2013.01); *H04N 1/00615* (2013.01); *H04N 1/00798* (2013.01); *H04N 1/40056* (2013.01)

(58) Field of Classification Search
CPC .......... B65H 3/047; B65H 5/025; B65H 5/36; G03G 15/235; G03G 15/6558; G03G 15/22; G03G 15/5062; G03G 2215/00616; H04N 1/00602; H04N 1/0066; H04N 1/00795; H04N 1/00809; H04N 1/028; H04N 1/047; H04N 1/1215

USPC .......................................................... 358/471
See application file for complete search history.

(56) References Cited

U.S. PATENT DOCUMENTS

| | | | |
|---|---|---|---|
| 9,948,803 B2 | 4/2018 | Isokawa | H04N 1/00602 |
| 2011/0051200 A1* | 3/2011 | Iwasaki | H04N 1/1215 |
| | | | 358/474 |
| 2012/0248678 A1* | 10/2012 | Serizawa | B65H 9/006 |
| | | | 271/10.01 |
| 2021/0360116 A1* | 11/2021 | Nagata | G03G 15/6573 |
| 2021/0373475 A1* | 12/2021 | Nagata | G03G 15/6573 |
| 2021/0377412 A1* | 12/2021 | Tokuma | H04N 1/0066 |
| 2021/0377416 A1* | 12/2021 | Sekigawa | H04N 1/00795 |
| 2022/0091557 A1* | 3/2022 | Sakurai | G03G 15/2028 |
| 2022/0131994 A1* | 4/2022 | Hozono | H04N 1/1061 |

FOREIGN PATENT DOCUMENTS

JP 2016-184863 10/2016

* cited by examiner

*Primary Examiner* — Negussie Worku
(74) *Attorney, Agent, or Firm* — Venable LLP

(57) ABSTRACT

A reading apparatus includes a first roller pair, a second roller pair provided downstream of the first roller pair, a light transmitting member, a reading portion and an opposing member. The transmitting member is disposed between the first and second roller pairs in a sheet feeding direction and on a first side in a vertical direction with respect to a nip line of the first roller pair. The opposing member is disposed on a second side opposite to the first side with respect to the transmitting member. As seen in a sheet widthwise direction, a surface of the second side of the transmitting member in the vertical direction is inclined, with respect to the nip line, to the second side toward downstream of the sheet feeding direction.

15 Claims, 13 Drawing Sheets

1001

PAPER LIBRARY EDITING

| PAPER BRAND | LENGTH OF SUB-DIRC (mm) | LENGTH OF MAIN-DIRC (mm) | BASIS WEIGHT (g/m²) | SUR-FACE PRO-PERTY | COLOR |
|---|---|---|---|---|---|
| ABC 1 | 210 | 297 | 75 | PAPER | WHITE |
| ABC 2 | 297 | 420 | 75 | PAPER | WHITE |
| DEF A-1 | 216 | 279 | 150 | ENBO-SSING | WHITE |
| DEF P-1 | 279 | 432 | 128 | DBLE COATED | WHITE |
| XYZ 81 | 210 | 297 | 75 | PAPER | ORANGE |
| XYZ 82 | 210 | 297 | 75 | PAPER | PINK |

910

ADD    EDIT    DELETE    POSITION ADJUST

1002

(a)

<POSITION ADJUSTING: SELECT CORRECTION METHOD>

ADJUSTING BY MANUAL

ADJUSTING BY TEST PAGE

READING APPARATUS AND IMAGE FORMING SYSTEM

FIELD OF THE INVENTION AND RELATED ART

The present invention relates to a reading apparatus and an image forming system.

In an image forming apparatus, it is required to adjust the image quality of the image forming apparatus (hereinafter referred to as image quality) with high accuracy. The elements of image quality include color reproducibility, color stability, and front-back registration accuracy. Image quality adjustment has been done by off-line measuring instruments and manual or visual adjustment by experienced workers. However, image quality adjustment has been a complicated process because it requires repetitive work to adjust the image quality with high accuracy, and also because multiple samples are measured and averaged in one operation. Therefore, the so-called in-line reading apparatus, which reads the image information of the sheet while receiving and conveying the sheet (recording material) on which the image was formed by the image forming apparatus, is sometimes used to enable automatic image quality adjustment. Japanese Laid-Open Patent Application No. 2016-184863 describes a method for automatically adjusting the image quality of a sheet of paper by reading the position of an identification mark (registry guide) from both sides of the paper received from an image forming apparatus and correcting the position of the image formed on the paper.

However, if the height of the sheet (the position of the sheet surface in the depth-of-field direction) relative to the reading unit in the reading apparatus fluctuates, the accuracy of the read image may decrease. In the Japanese Laid-Open Patent Application No. 2016-184863, the feed angle at which the first feeding roller feeds the sheet toward the reading position of the reading unit and the discharging angle at which the second feeding roller discharges the sheet from the reading position are inclined with respect to the surface of the opposing member facing the reading unit. With this configuration, the sheet is bent between the first and second feeding rollers and conveyed while contacting the surface of the opposing member, thereby suppressing fluctuations in the height of the sheet relative to the reading unit.

Incidentally, in the configuration described in the above document, the sheet is actively brought into contact with the opposing member in order to stabilize its height relative to the reading unit, and the sheet comes into contact with the opposing member at a relatively high contact pressure. However, when the conveyed sheet comes into contact with the opposing member at a high contact pressure, sheet dust (so-called paper dust) is generated and deposited, which may reduce the image reading accuracy or leave rubbing marks in the image on the sheet.

SUMMARY OF THE INVENTION

The present invention provides a new form of reading apparatus and image forming system that can realize highly accurate image reading.

One embodiment of the present invention is a reading apparatus for reading an image information of a sheet on which an image is formed by an image forming apparatus, said reading apparatus comprising: a first roller pair configured to feed the sheet in a sheet feeding direction; a second roller pair disposed downstream of said first roller pair in the sheet feeding direction and configured to feed the sheet, said second roller pair being disposed to overlap with a nip line passing through a nip portion of said first roller pair and extending in the sheet feeding direction as seen from a sheet widthwise direction perpendicular to the sheet feeding direction; a transmitting member disposed between said first roller pair and said second roller pair in the sheet feeding direction and on a first side in a height direction perpendicular to the sheet feeding direction and the sheet widthwise direction with respect to the nip line, and configured to transmit a light: a reading portion configured to read the image information of the sheet, fed from said first roller pair toward said second roller pair, through said transmitting member; and an opposing member disposed on a second side opposite to the first side in the height direction with respect to said transmitting member and configured to oppose said reading portion through said transmitting member, wherein, as seen in the sheet widthwise direction, a surface of the second side of said transmitting member in the height direction is inclined, with respect to the nip line, to the second side in the height direction toward downstream of the sheet feeding direction.

Further features of the present invention will become apparent from the following description of exemplary embodiments (with reference to the attached drawings).

Figure 4:
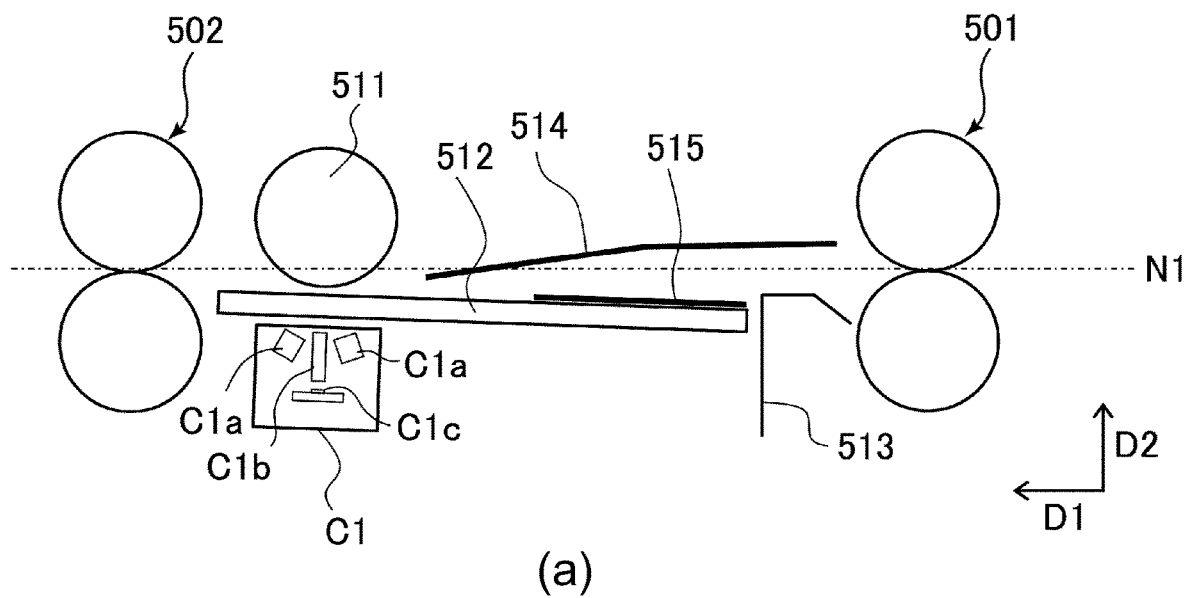
Figure 4:
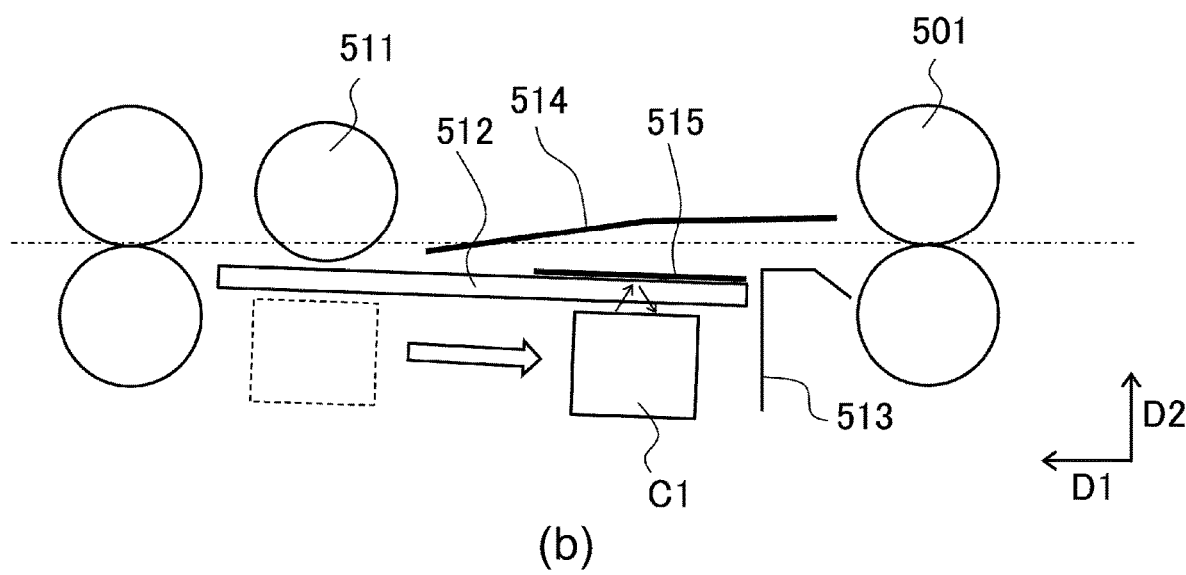

Part (a) and part (b) of FIG. 4 are views to explain the shading operation for the embodiment.

Figure 5:
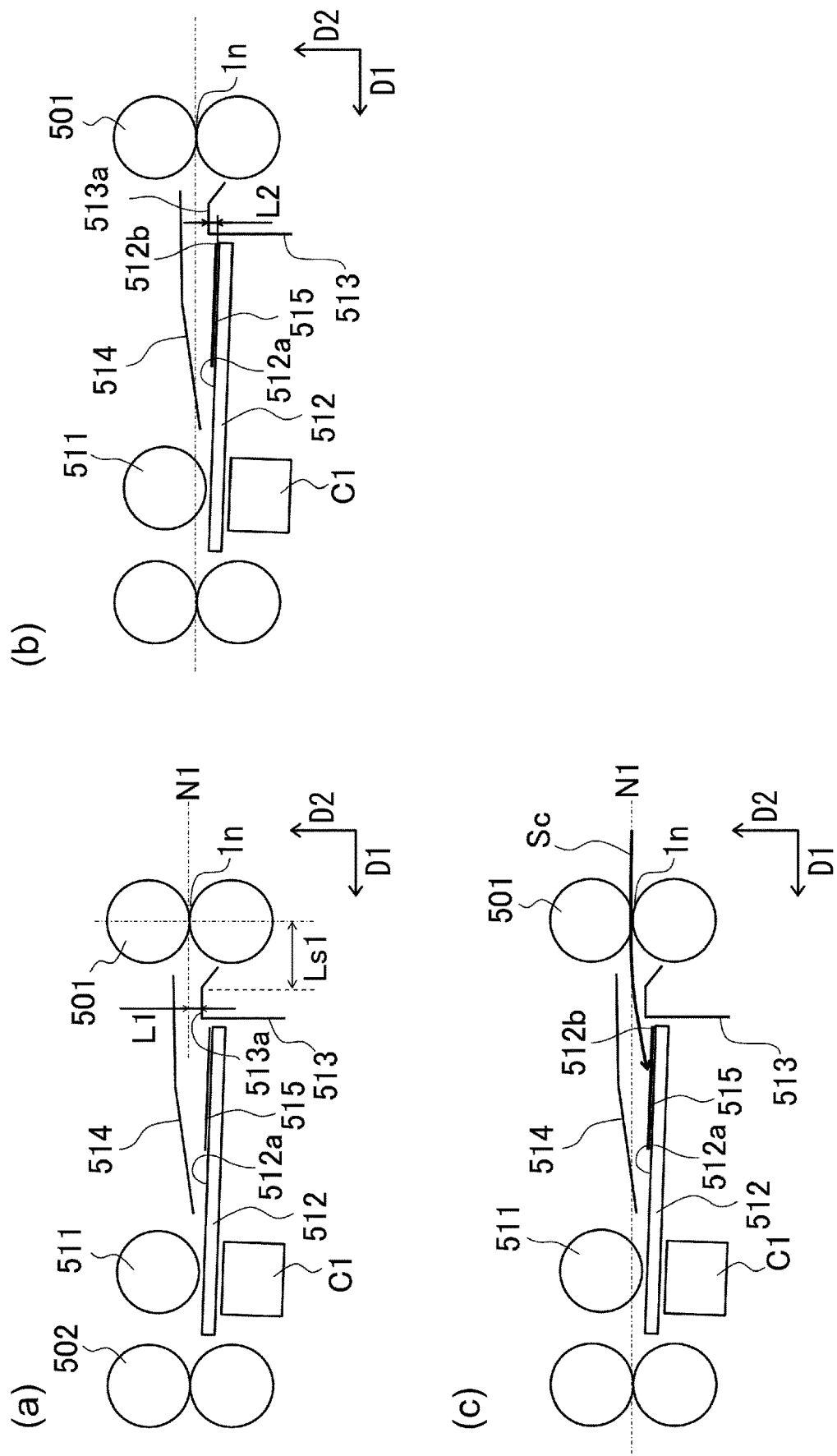

Part (a), part (b) and part (c) of FIG. 5 are cross-sectional views of the first reading portion for the embodiment.

Figure 6:
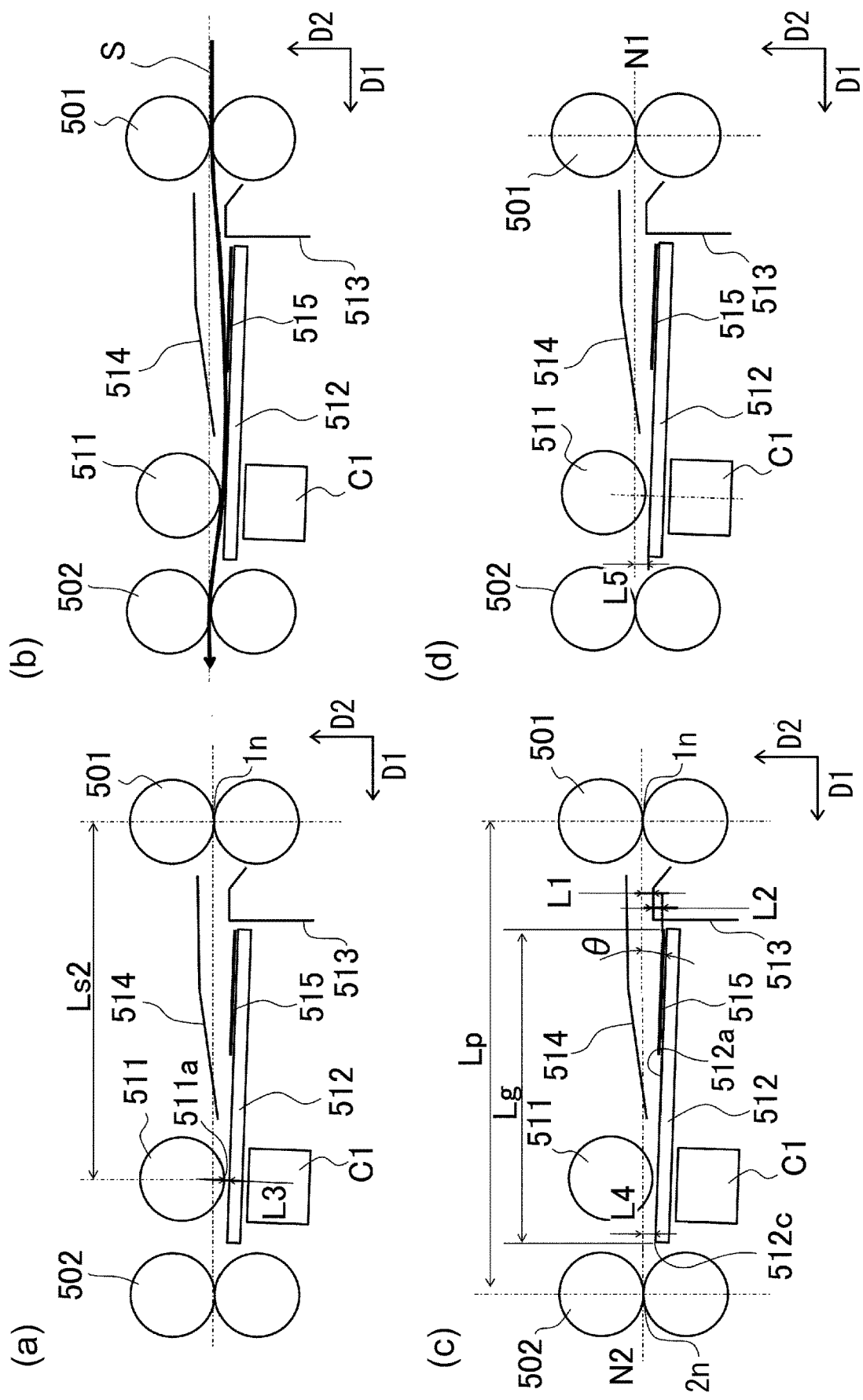

Part (a), part (b), part (c) and part (d) of FIG. 6 are cross-sectional views of the first reading portion for the embodiment.

Figure 7:
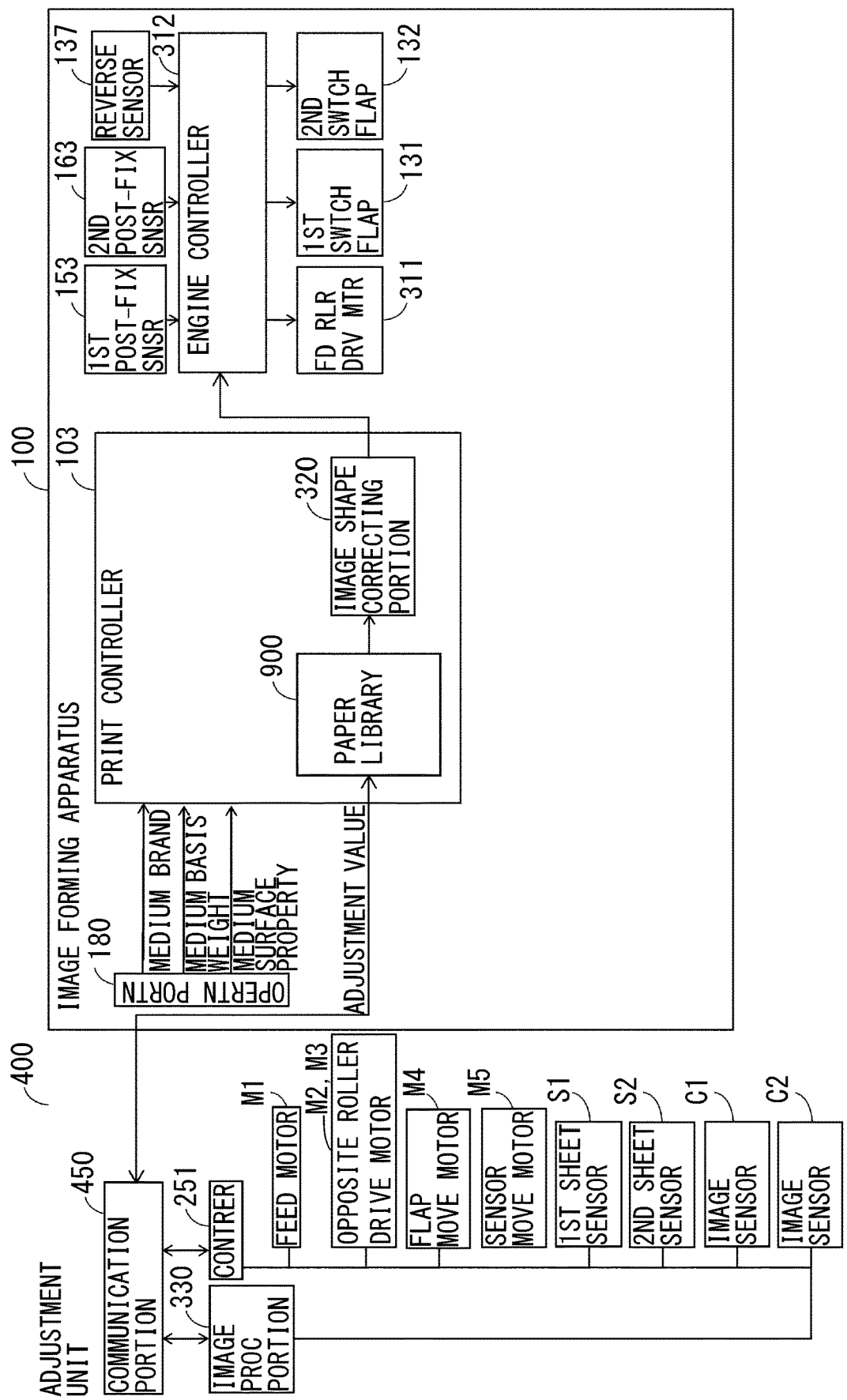

FIG. 7 is a block drawing of the configuration of the image forming system for the embodiment.

Part (a) and part (b) of FIG. 8 are images showing the display screens of the user interface for the embodiment.

Figure 9:
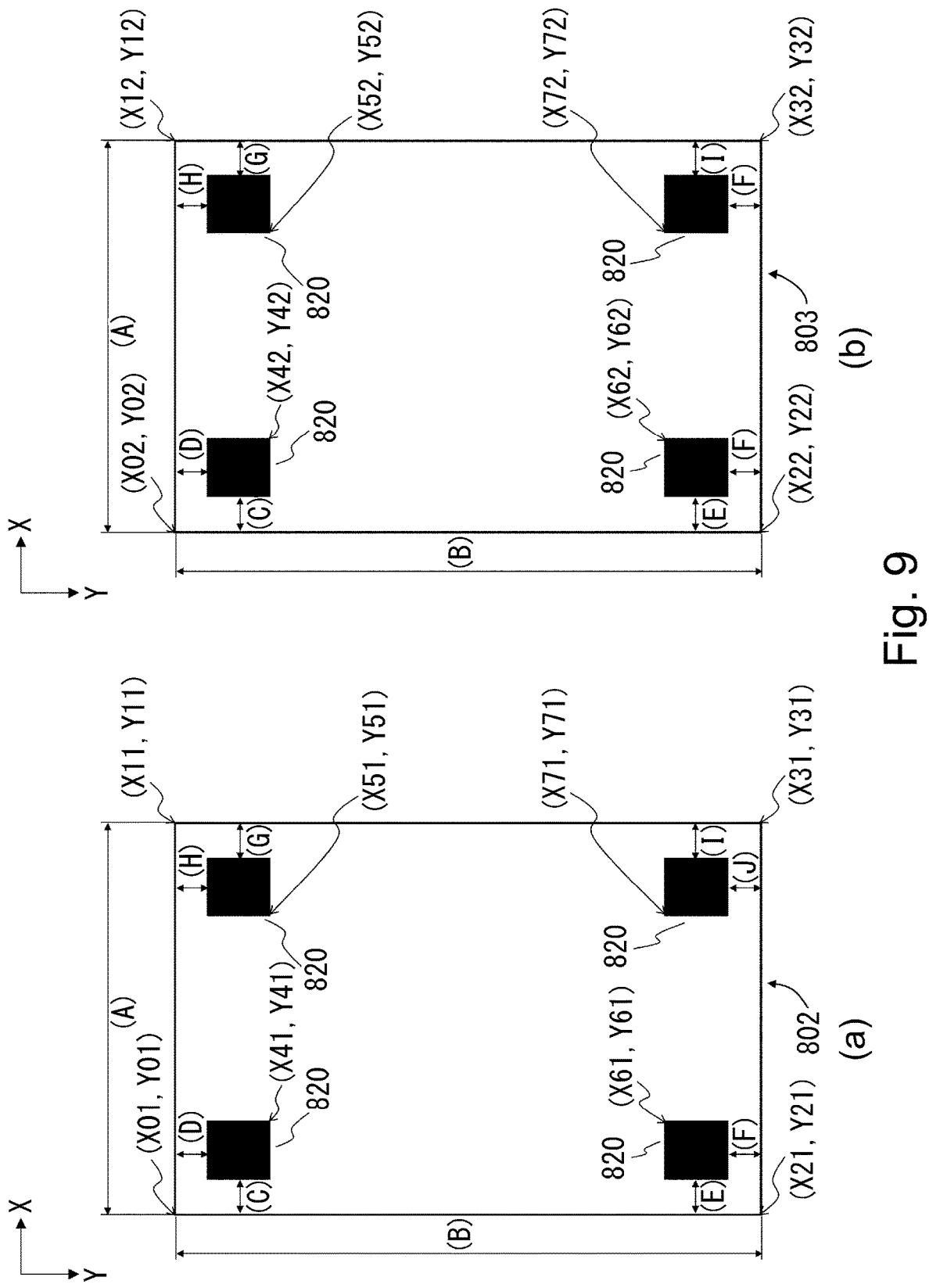

Part (a) and part (b) of FIG. 9 are drawings showing the test patterns for measurement for the embodiment.

Figure 10:
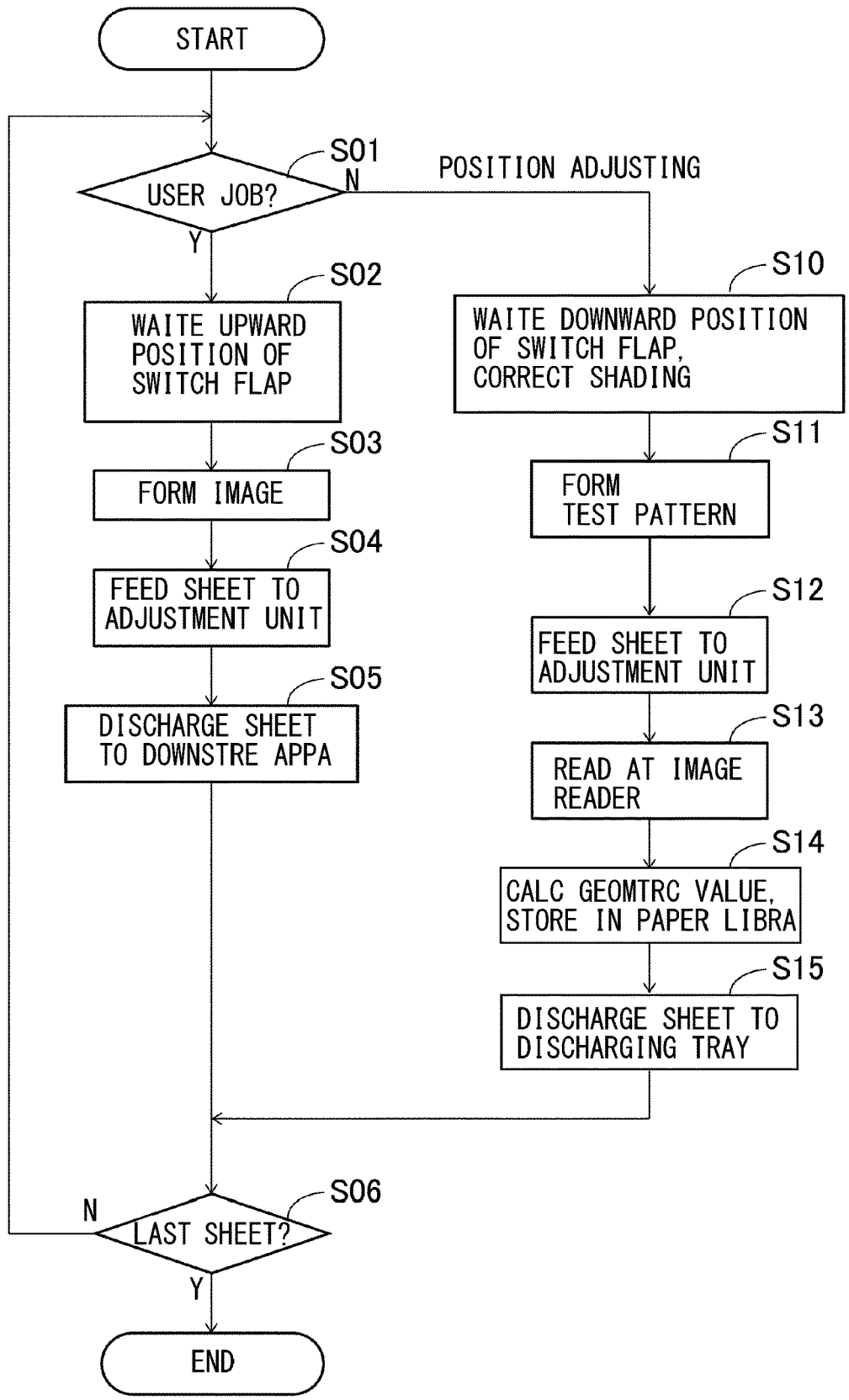

FIG. 10 is a flowchart showing the control method of the image forming system for the embodiment.

Figure 11:
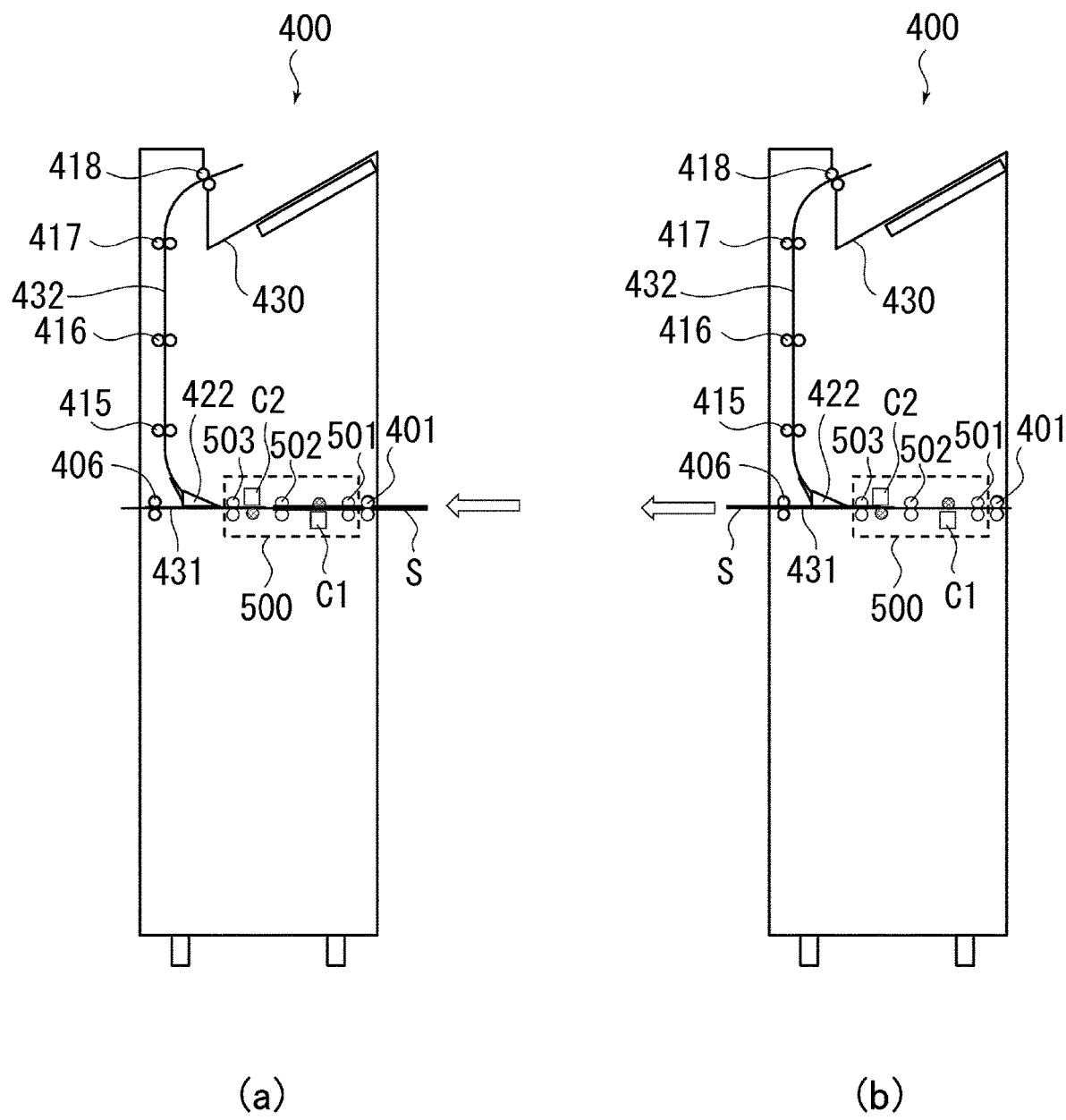

Part (a) and part (b) of FIG. 11 are views describing the operation of a normal job for the embodiment.

Figure 12:
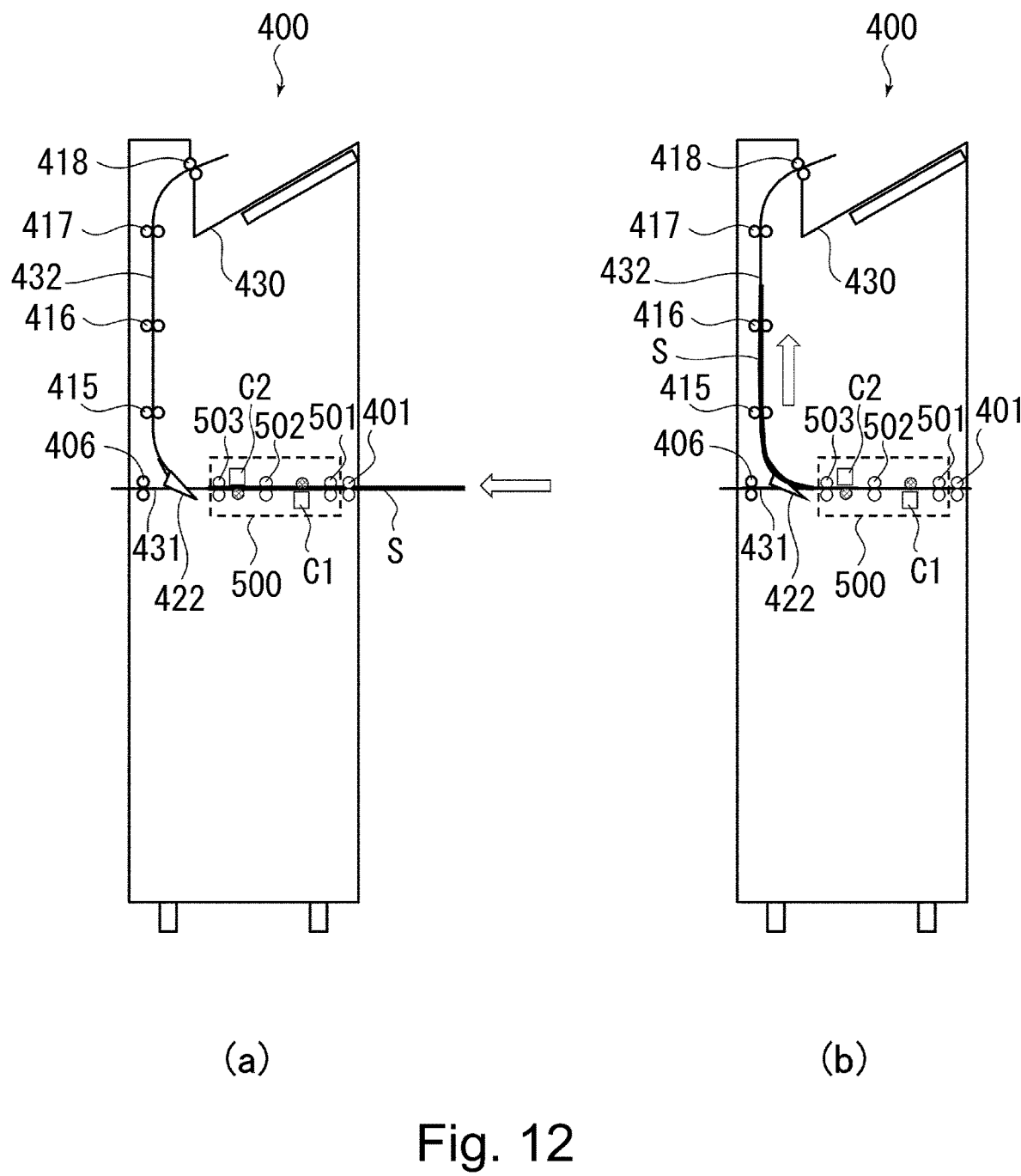

Part (a) and part (b) of FIG. 12 are views showing the operation of an image position adjustment job for the embodiment.

Figure 13:
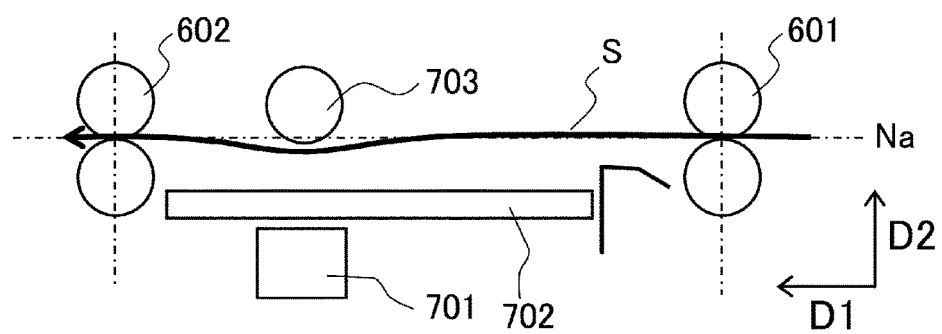
Figure 13:
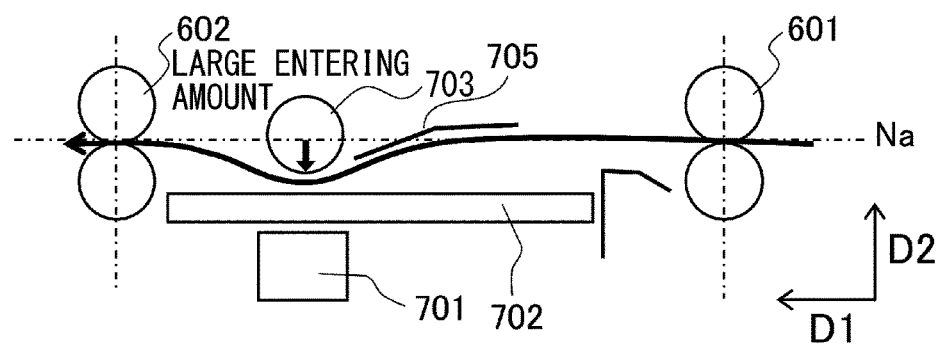
Figure 13:
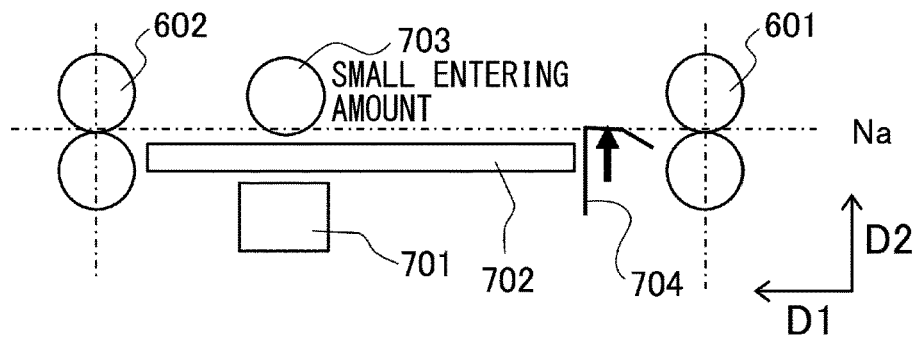

Part (a), part (b) and part (c) of FIG. 13 are views showing the configuration of the comparison example.

DESCRIPTION OF THE EMBODIMENTS

The following is a description of an exemplary embodiment of the present invention with reference to the drawings.

Figure 1:
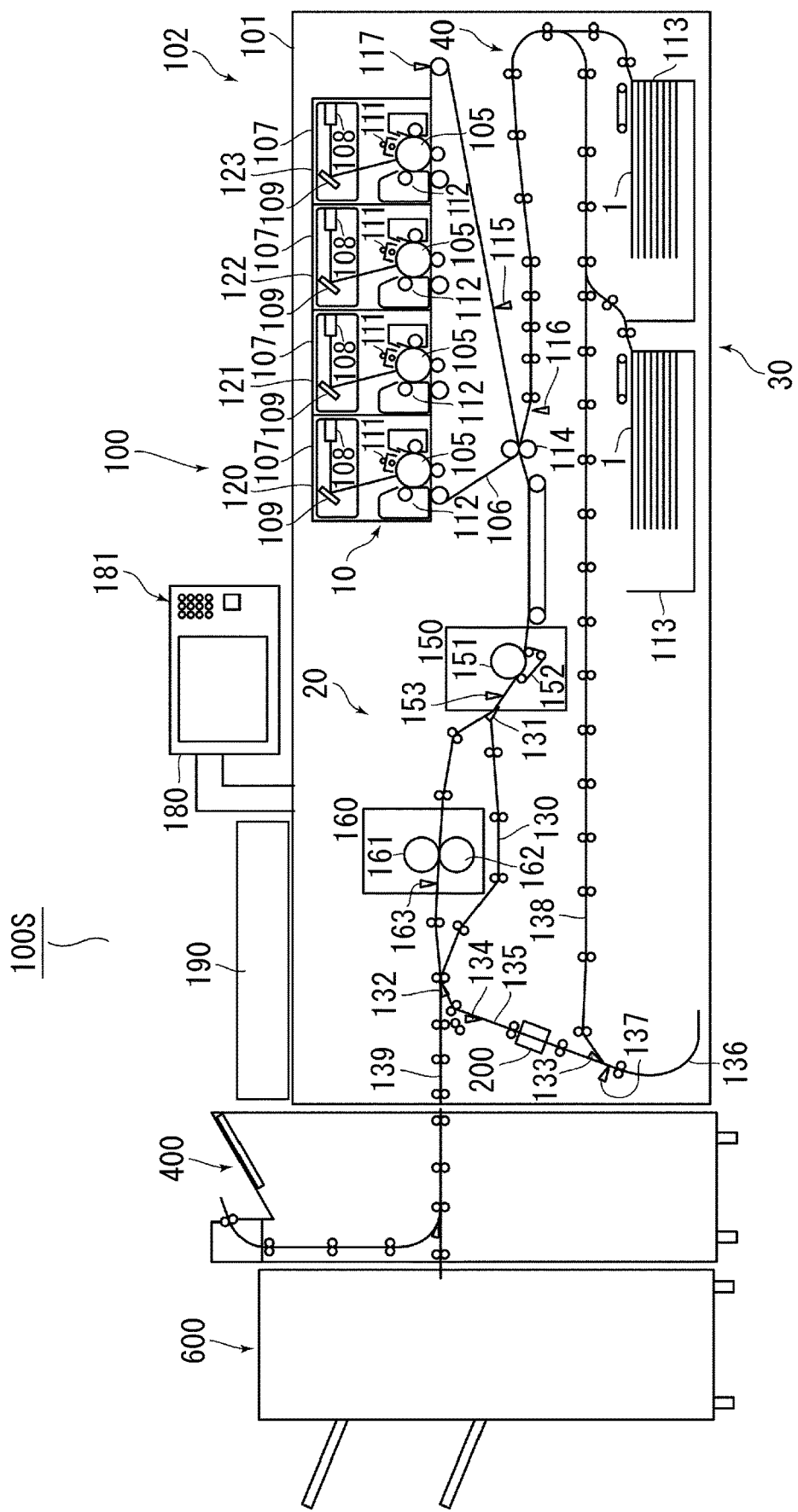
FIG. 1 is a schematic view of an image forming system of an embodiment of the present invention.

FIG. 1 is a schematic view of the image forming system 100S for one of the embodiments. The image forming system 100S is configured with an image forming apparatus 100, an adjustment unit 400, and a finisher 600. The adjustment unit 400 is an example of a reading apparatus that reads the image information on the sheet, and the finisher 600 is an example of a sheet processing device that processes the sheet.

A casing 101 of the image forming apparatus 100 (also called "the main assembly of the apparatus") contains the image forming engine 102 as the image forming portion and a main controller that controls the operation of the image forming system 100S including the image forming apparatus 100. The image forming engine 102 of this embodiment includes an optical processing mechanism and a fusing processing mechanism that form images on the recording material by an electrophotographic process, and a feeding processing mechanism and a conveying processing mechanism that feed and convey sheets 110 used as recording material. The image forming apparatus 100 is also equipped with a control board that includes an engine control portion 312 (FIG. 7) that controls the processing (e.g., feeding process) by each of these mechanisms, and a printer controller 103 (FIG. 7) that controls the entire image forming system 100S. The engine control portion 312, for example, controls the feeding roller driving motor 311 which controls the operation of the guiding members (131, 132) that switch the feeding path based on the detection signals of the sensors (137, 153, 163) installed on the sheet feeding path in the image forming apparatus 100. The recording material can be a variety of sheet materials of different materials, thickness, sizes and shapes, such as plain or thick paper, coated or embossed paper, plastic film, or cloth.

The optical processing mechanism is provided with stations 120, 121, 122, and 123 that form toner images of yellow, magenta, cyan, and black colors and an intermediate transfer belt 106. At each station 120-123, a primary charger 111 charges the surface of a photosensitive drum 105, which is a drum-shaped image carrier (also called an electrophotographic photoreceptor). A laser scanner portion 107 exposes the photosensitive drum 105 based on the command signal generated based on the image data and sent to the laser scanner portion 107. The laser scanner portion 107 has a laser driver that drives the laser beam emitted from a semiconductor laser (not shown) on and off, and the laser beam from the semiconductor laser is divided in a main scanning direction by a rotating polygon mirror and is directed to the photosensitive drum 105 through a reflecting mirror 109. As a result, an electrostatic latent image corresponding to the image data is formed on the surface of the photosensitive drum 105.

A developing member 112 accommodates a developer containing toner inside and supplies the charged toner particles to the photosensitive drum 105. The toner particles adhere to a drum surface according to a surface electrical potential distribution, and the electrostatic latent image carried on the photosensitive drum 105 is developed (i.e., visualized) as a toner image. The toner image carried on the photosensitive drum 105 is transferred (i.e., primary transfer) to the intermediate transfer belt 106 by the primary transfer roller to which a voltage of opposite polarity to that of the toner's normal charge is applied. In the case of forming a color image, the toner images formed by the four stations 120-123 are multiply transferred so that they overlap each other on the intermediate transfer belt 106, forming a full-color toner image on the belt.

On the other hand, the feeding process mechanism feeds sheets 110 one by one from the storage compartment 113, which is withdrawable from the casing 101 of the image forming apparatus 100 to a transfer roller 114. The toner image carried on the intermediate transfer belt 106, which is an intermediate transfer material, is transferred (i.e., secondary transfer) to the sheet 110 by the transfer roller 114.

The intermediate transfer belt 106 is surrounded by a start position detection sensor 115 to determine a start position of printing when image formation is performed, a feed timing sensor 116 to determine a feeding timing of the sheet 110, and a density sensor 117. The density sensor 117 measures the density of a patch image carried on the intermediate transfer belt 106. The main controller adjusts operating conditions of the optical processing mechanism (e.g., setting the charging target potential of the primary charger 111 and the bias voltage of the developing member 112) based on the detection results of the density sensor 117.

A fixing process mechanism of the present embodiment is constituted by a first fixing device 150 and a second fixing device 160. The first fixing device 150 includes a fixing roller 151 for applying heat to the sheet 110, a pressure belt 152 for pressing the sheet 110 against the fixing roller 151, and a first post-fixing sensor 153 to detect the completion of the fixing process by the first fixing device 150. Each of the rollers, including the fixing roller 151, is a hollow roller and each has a heater inside. The first fixing device 150 applies heat and pressure to the toner image on the sheet while nipping and feeding the sheet 110 between the fixing roller 151 and the pressure belt 152. This causes the toner particles to melt and then adhere, thereby fixing the image on the sheet 110.

A second fixing device 160 is located further downstream in the feeding path of the sheet 110 than the first fixing device 150. The second fixing device 160 has the function of increasing the gloss level of the image that has been fixed by the first fixing device 150 and securing the fixing performance of the image on the sheet 110. The second fixing device 160, like the first fixing device 150, includes a fixing roller 161 and a pressure roller 162 as a pair of rotating elements that heat and press the sheet 110 while feeding it, and a second post-fixing sensor 163 that detects the completion of the fixing process by the second fixing device 160.

Depending on the type of sheet 110, there may be no need to pass through the second fixing device 160. In such a case, the image forming apparatus 100 has a detour feeding path 130 to discharge the sheet 110 without going through the second fixing device 160 for the purpose of reducing energy consumption. The sheet 110 fed from the first fixing device 150 is guided by a first switching flap 131 to either the second fixing device 160 or the detour feeding path 130.

The sheet 110 that has passed through the second fixing device 160 or the detour feeding path 130 is guided by a second switching flap 132 to either a discharging feeding path 139 or a reverse feeding path 135. The sheet 110 fed into the reverse feeding path 135 is detected by a reverse sensor 137 and the front and the rear end of the sheet feeding direction are switched by the switchback operation performed by a reverse portion 136. In the case of double-sided printing, the sheet 110 with the image formed on the first side is fed to the transfer roller 114 again via a re-feeding path 138 with the front and rear ends switched by the reversing portion 136, and the image is formed on the second side. The sheet 110 that has finished image formation on one side in case of single-sided printing or the sheet 110 that has finished image formation on the second side in case of double-sided printing is discharged from the image forming apparatus 100 through the discharging feeding path 139. In addition, a switching flap 134 is provided between the reverse feeding path 135 and the discharging feeding path 139 to guide the sheet 110 switched back by the reversing portion 136 toward the discharging feeding path 139. By installing the switching flap 134, it is possible to select the front and back of the sheet 110 when it is discharged from the image forming apparatus 100.

A document reading apparatus 190 is placed in the upper part of the image forming apparatus 100. The document reading apparatus 190 includes a main assembly fixed to the casing 101 of the image forming apparatus 100 and an automatic document feeding device (Auto Document Feeder, hereinafter referred to as ADF). The ADF is equipped with a feeding tray on which the document sheets are placed and a discharging tray on which the document sheets whose image information has been read are discharged. The document sheets loaded in the feeding tray are fed and conveyed, one by one, by the feeding unit. During this process, the document sheet is optically scanned by the image sensor to read the image information on the sheet. The document sheets whose image information has been read are discharged by the discharging roller pair into the discharging tray.

The image forming apparatus 100 has an operation portion 180 that serves as the user interface of the image forming system 100S (see also FIG. 1). The operation portion 180 is equipped with a display as a display portion that shows information to the user. The operation portion 180 is also equipped with physical keys, such as a numeric keypad and a print execution button, and a touch panel function of the display as an input portion that allows the user to input commands and data to the image forming system 100S. By operating the operation unit 180, the user can input information representing sheet attributes, such as the brand, basis weight, and surface treatment of the sheet set in a certain storage compartment 113, to the main controller. The inputted sheet attributes are registered in a paper library 900 stored in the memory 304.

Although FIG. 1 describes an intermediate transfer type color image forming apparatus, a direct transfer type image forming engine, which transfers the toner image formed on the image carrier to the sheet without using an intermediate transfer device, may also be installed. For example, an inkjet printing unit or an offset printing mechanism may be installed as an image forming portion, not limited to the electrophotographic method.

(Adjustment Unit)

Next, the adjustment unit 400 will be explained. The adjustment unit 400 functions as an image reading apparatus to read the image information in an image reading portion 500 from the sheet formed by the image forming apparatus 100. In addition, the adjustment unit 400 of the present embodiment is used to adjust the execution conditions of the image forming operation performed by the image forming apparatus 100 as described below.

In the image forming system 100S in FIG. 1, the adjustment unit 400 is installed between the image forming apparatus 100 and the finisher 600 in the horizontal direction H (left-right direction in the figure). In other words, the upstream device of the adjustment unit 400 in the present embodiment is the image forming apparatus 100, and the downstream device of the adjustment unit 400 is the finisher 600. The finisher 600 has a processing unit that processes the sheets, such as binding or saddling, and discharges the processed sheet bundle (or, if no processing is required, the sheets received from the upstream unit) as a product of the image forming system 100S.

The devices connected upstream and downstream of the adjustment unit 400 vary depending on the configuration of the image forming system 100S. For example, the adjustment unit 400 may not be directly connected to the image forming apparatus 100, but an intermediate unit may be placed between the image forming apparatus 100 and the adjustment unit 400, and the adjustment unit 400 may receive sheets through the intermediate unit. An example of an intermediate unit is a device that performs a coating process to add gloss by attaching transparent toner to the image surface of the image formed sheet. In some cases, a sheet processing device other than the finisher 600 is connected downstream of the adjustment unit 400. Examples of such sheet processing devices include an inserter that inserts a sheet that serves as a cover sheet into a sheet bundle, a trimmer that cuts and aligns the edges of a bound sheet bundle, and a stacker that can be moved by a cart while accommodating a large number of deliverables. The adjustment unit 400 may also be configured with a discharging tray for discharging sheets as deliverables of the image forming system 100S (a structure in which the finisher 600 is omitted from FIG. 1).

Figure 2:
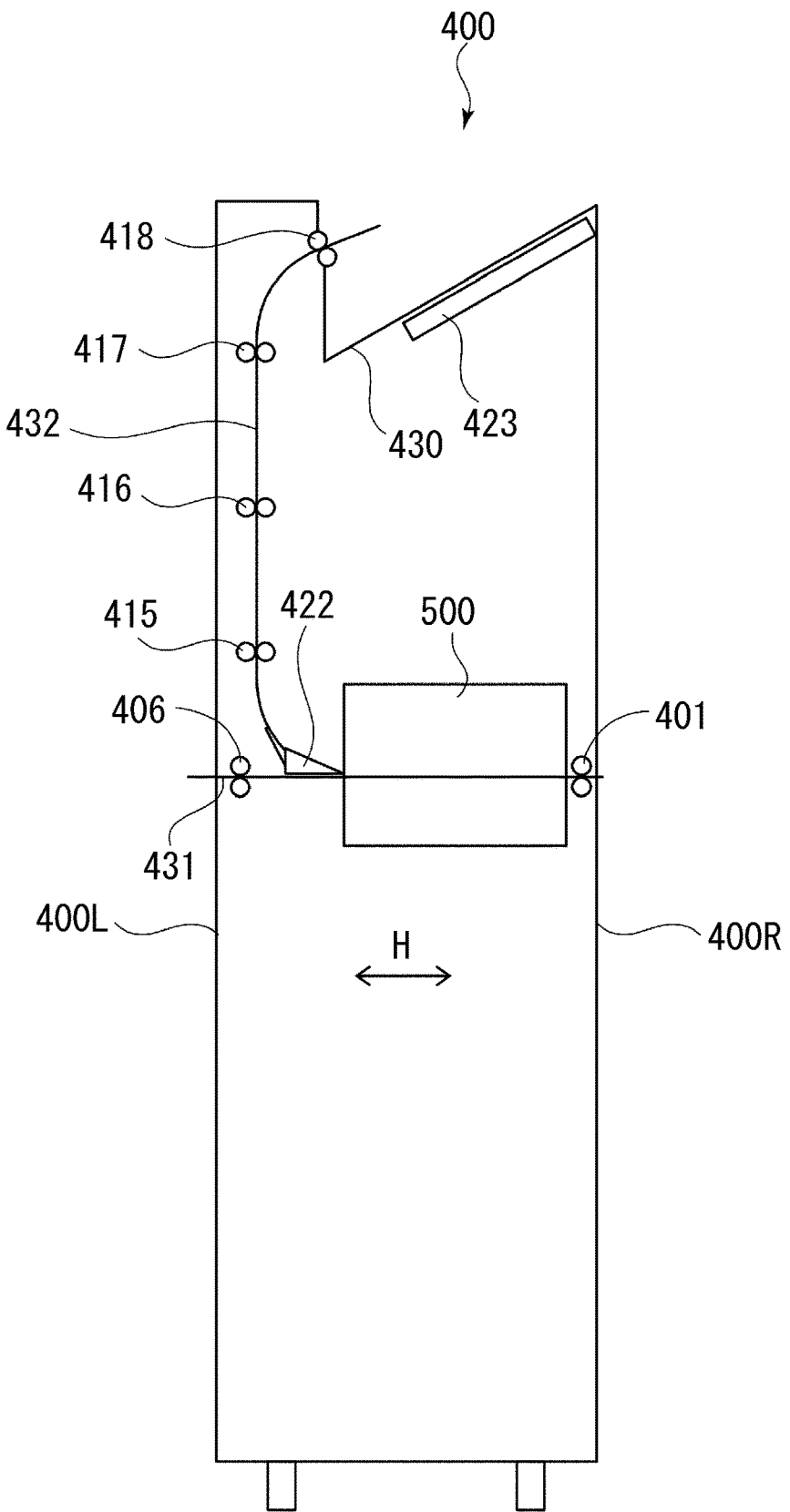
FIG. 2 is a schematic view of the adjustment unit for the embodiment.

As shown in FIG. 2, the adjustment unit 400 is equipped with an image reading portion 500, a through path 431, and a discharging path 432 that constitute the sheet feeding path in the adjustment unit. In addition, a discharging tray 430 and an extension tray 423 that can be withdrawn from the discharging tray 430 are provided in the upper part of the adjustment unit 400.

The through path 431 is a feeding path that receives the sheets discharged from the image forming apparatus 100 and feeds them to the finisher 600, and extends in an approximate horizontal direction H. An entry roller pair 401 and an exit roller pair 406 are arranged in the through path 431. In other words, the through path 431 extends along a straight line in the horizontal direction H when the image forming system 100S is viewed from the front. The through path 431 extends from an opening (entry port) provided in the side 400R on one side (image forming apparatus 100 side) to an opening (discharging port) provided in the side 400L on the other side (finisher 600 side) in the horizontal direction H of the adjustment unit 400.

The image reading portion 500 is located between the entry roller pair 401 and the exit roller pair 406 in the through path 431. The image reading portion 500 reads the image information of the sheet being fed from the entry roller pair 401 to the exit roller pair 406. The detailed configuration of the image reading portion 500 will be described later.

The discharging path 432 branches off from the through path 431 and extends upward. In the discharge path 432, a first feeding roller pair 415, a second feeding roller pair 416, a third feeding roller pair 417, and a discharge roller pair 418 are arranged in the discharge path 432 sheet feeding direction in this order from upstream to downstream. At the junction portion of the discharge path 432 and the through path 431, a switching flap 422, which is a guiding member capable of switching the sheet feeding path between the through path 431 and the discharge path 432, is installed. The switching flap 422 is located downstream of the image reading portion 500 and upstream of the exit roller pair 406 in the sheet feeding direction in the through path 431. For example, the image reading portion 500 may be arranged in a feeding path that branches off from the through path 431 and then merges into the through path 431.

With switching flap 422, for example, it is possible to control that the sheets with normal images are fed to the downstream device via the exit roller pair, while the sheets with images for adjustment of the execution conditions of the image forming operation are discharged to the discharging tray 430 via the discharging path. In other words, by switching the sheet as the deliverable required by the user (user job sheet) and the sheet created to adjust the execution conditions of the image forming operation (adjustment sheet) to different trays, the adjustment sheet can be avoided to be inserted between the user job sheets. A user job is also called a normal job. Since the adjustment sheets are basically unnecessary for the user, the above switching operation can avoid giving the user the trouble of removing the adjustment sheets that have gotten in between the user job sheets (normal job sheets).

(Image Reading Portion)

Figure 3:
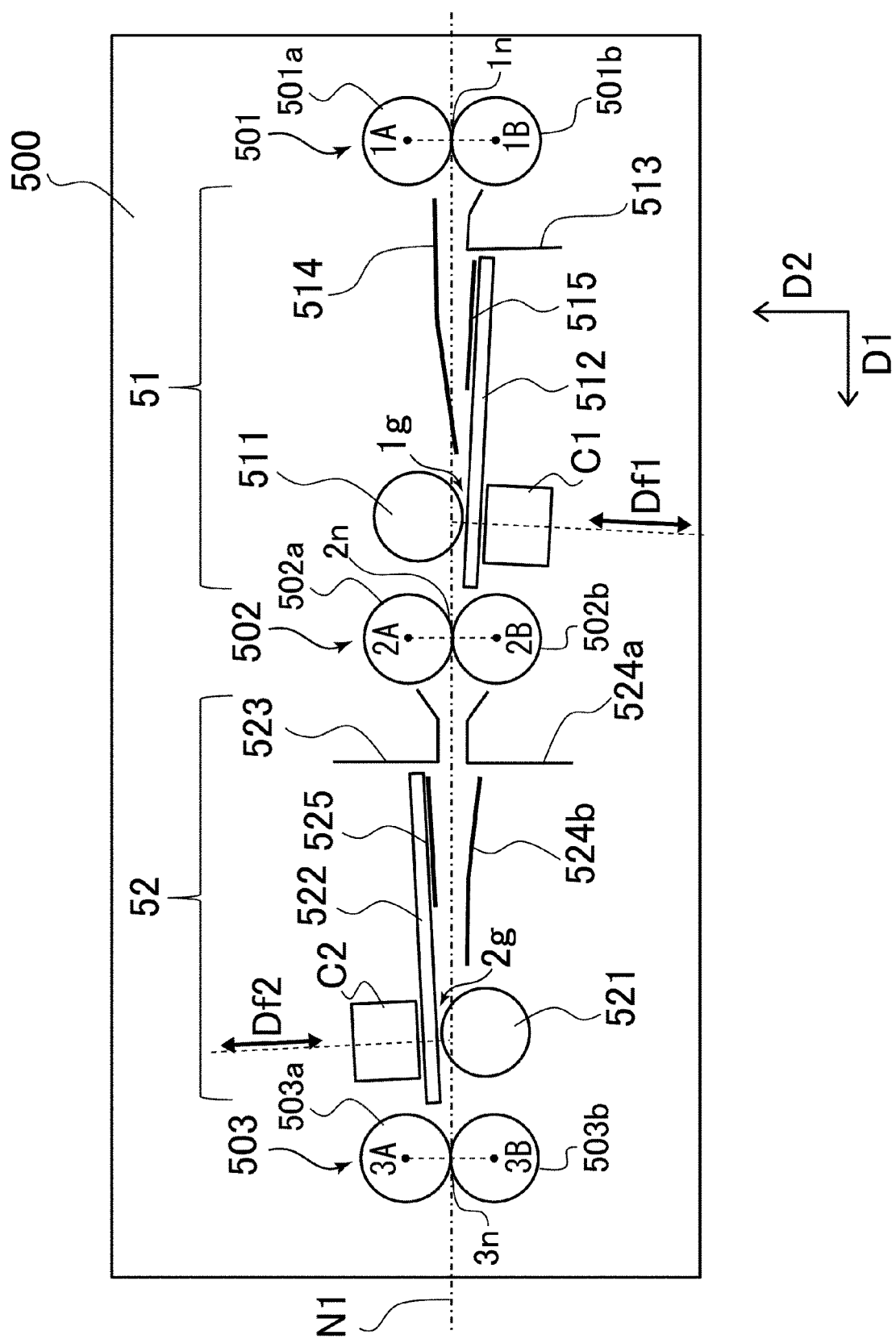
FIG. 3 is a schematic view of the image reading portion of the embodiment.

This section describes the image reading portion 500. FIG. 3 is a schematic view of the image reading portion 500 viewed in the sheet widthwise direction. The image reading portion 500 includes a first reading portion 51 that reads image information from the first side of the sheet (the bottom side of the sheet in the through path 431) and a second reading portion 52 that reads image information from the second side of the sheet (the top side of the sheet in the through path 431), which is opposite to the first side of the sheet. In addition, the image reading portion 500 has a first roller pair 501, a second roller pair 502, and a third roller pair 503 as feeding portions that feed the sheets through the first reading portion 51 and the second reading portion 52. With respect to the sheet feeding direction D1 in the through path 431, the first reading portion 51 is located between the first roller pair 501 and the second roller pair 502, and the second reading portion 52 is located between the second roller pair 502 and the third roller pair 503.

In the present embodiment, the sheet feeding direction D1 refers to the direction from the nip portion 1n of the first roller pair 501 to the nip portion 2n of the second roller pair 502. Sheet widthwise direction is the direction in which the sheet is nipped by the first roller pair 501 and is perpendicular to the sheet feeding direction D1, and refers to the rotational axis direction of the first roller pair 501, the first reading portion 51 and the second reading portion 2n. Height direction D2 is the direction perpendicular to sheet feeding direction D1 and sheet widthwise direction. In the present embodiment, when the adjustment unit 400 is installed on a horizontal surface, the height direction D2 coincides with the vertical direction (gravity direction).

In the present embodiment, the path from nip portion 1n of first roller pair 501 through nip portion 2n of second roller pair 502 to nip portion 3n of third roller pair 503 is a straight feeding path (straight path) along the nip line N1 of the first roller pair 501. In other words, when viewed in sheet widthwise direction, the second roller pair 502 overlaps the nip line N1 of the first roller pair 501, and the third roller pair 502 also overlaps the nip line N1 of the first roller pair 501. Nip line N1 is a virtual line extending in the direction perpendicular to the line segment connecting the rotational axes 1A and 1B of the rollers 501a and 501b (i.e., sheet feeding direction D1) through the center of the nip portion 1n where the two rollers 501a and 501b of the first roller pair 501 touch each other.

Preferably, the nip line N1 of the first roller pair 501 should pass between the rotational axis 2A, 2B of the two rollers 502a, 502b that configure the second roller pair 502 and between the rotational axis 3A, 3B of the two rollers 503a, 503b that configure the third roller pair 503. Furthermore, it is preferable to configure the nip line N1 of the first roller pair 501 to pass through the nip portions 2n, 3n of the second roller pair 502 and the third roller pair 503 (the nip lines of each roller pair substantially match), except for manufacturing tolerances. By adopting a straight path for the image reading portion 500, it is easier to respond to a higher sheet feeding speed (throughput improvement), and the contact pressure between the sheet and the feeding guide is lowered to reduce the generation of paper dust and image rub marks.

Each of the first reading portion 51 and the second reading portion 52 of an image reading portion 500 includes sensors C1, C2 as a reading portion, opposing rollers 511, 521 as an opposing member, and glasses 512, 522 as a transmitting member. The opposing rollers 511, 521 are also sheet urging members, sheet holding members, sheet guides or backing members. The sensor C1, the opposing roller 511 and the glass 512 of the first reading portion 51 are first reading portions, first opposing members and first transmitting members of the present embodiment. The sensor C2, the opposing roller 521 and the glass 522 of the second reading portion 52 are second reading portions, second opposing members and second transmitting members of the present embodiment.

For the first reading portion 51, a gap 1g, which is a gap (space) through which the sheet to be read passes, is formed between the glass 512 and the opposing roller 511 facing each other in a height direction D2. The sensor C1 faces the glass 512 and the opposing roller 511 with the gap 1g in between. In other words, the sensor C1 and the glass 512 are located on one side of height direction D2 (first side, lower side in the present embodiment) with respect to the gap 1g, and the opposing roller 511 is located on the opposite side of height direction D2 (second side, upper side in the present embodiment) with respect to the gap 1g.

The second reading portion 52 has the same configuration as the first reading portion 51, except that the positional relationship of the height direction D2 is reversed. That is, a gap 2g is formed between a glass 522 and an opposing roller 521 facing each other in the height direction D2. The sensor C2 is facing the glass 522 and the opposing roller 521 with the gap 2g in between. In other words, the sensor C2 and the glass 522 are located on the other side of height direction D2 (second side, upper side in the present embodiment) with respect to the gap 2g, and the opposing roller 521 is located on one side of height direction D2 (first side, first side in the present embodiment) with respect to the gap 2g.

The glasses 512 and 522 are transmitting members that transmit light, and glass is used for its transparency, strength, and light resistance. The glass has a relatively low degree of freedom in terms of shape, and in most cases, a roughly rectangular member cut from a flat glass plate is used. The reference plates 515 and 525, which are used as reference portions for shading correction described below, are attached to the glasses 512 and 522.

The sensor C1 reads the image information on the first side of the sheet by optically scanning the first side of the sheet that passes through gap 1g through the glass 512 and converting it into an electronic signal. The sensor C2 reads the image information on the second side of the sheet by optically scanning the second side of the sheet passing through gap 2g through the glass 522 and converting it into an electronic signal. Image information from the sensors C1 and C2 is used, for example, to detect the position of a patch image in a test pattern with respect to the edge of the sheet in an image position adjustment described below.

The sensors C1 and C2 are image sensors of CIS method. As shown in part (a) of FIG. 4, the sensor C1 includes an illumination portion C1a, a light collecting lens C1b, and a light receiving element C1c. The illumination portion C1a irradiates light toward the gap 1g. An illumination portion 701a includes an LED as a light source installed on a substrate, and a light guide that extends from a position opposite the LED in the sheet widthwise direction and irradiates light from the LED to the entire area of the gap 1g in the sheet widthwise direction. The light collecting lens C1b focuses the reflected light from the sheet passing through the gap 1g and images it on the light receiving surface of the light receiving element C1c. The light collecting lens C1b is a lens array consisting of cylindrical equal-sized lenses lined up in the sheet widthwise direction corresponding to each of the light receiving elements C1c. The light receiving elements C1c are CMOS sensors arranged in sheet widthwise direction on a substrate. Part (a) of FIG. 4 shows the sensor C1 in the first reading portion 51, but the sensor C2 in the second reading portion 52 has a substantially similar configuration to that of sensor C1.

As shown in FIG. 3, opposing rollers 511 and 521 are rollers that can rotate around a rotation axis extending in the sheet widthwise direction. The opposing roller 511 is facing the sensor C1 through the glass 512 toward the direction intersecting a sheet feeding direction D1 and the sheet widthwise direction (in particular, the depth-of-field direction Df1 of a sensor C1) at a reading position of the sensor C1. Similarly, the opposing roller 521 is facing toward the direction intersecting the sheet feeding direction D1 and the sheet widthwise direction (in particular, the depth-of-field direction Df2 of the sensor C2) at the reading position of the sensor C2, through a glass 522. The depth-of-field directions Df1 and Df2 represent the directions along the representative optical path of the light taken in by the sensors C1 and C2 from the reading target, which is the optical axis direction of a light collecting lens C1b when CIS is used as the sensors C1 and C2.

Since the opposing rollers 511 and 521 regulate the width of gaps 1g and 2g in the depth-of-field directions Df1 and Df2, the position of the sheet in the depth-of-field directions Df1 and Df2 as it passes through the reading position is regulated. In other words, the opposing rollers 511 and 521 urge the sheet toward the glass 512 and 522 at the reading position of the sensors C1 and C2. This allows the sheet to pass through the focus position (or a position close enough to the focus position) where the sensors C1 and C2 focus at the reading position of the sensors C1 and C2, and the sensors C1 and C2 can read images with high accuracy. For example, from the image information acquired by the sensors C1 and C2, the edge of the sheet and the position of the patch can be determined with high accuracy. As a result, the image forming system 100S can perform image position adjustment and color adjustment based on the image information read by the image reading portion 500 with high accuracy.

Each of opposing rollers 511, 521 is driven by a motor (not shown) in the direction of rotation in which the roller surface moves in sheet feeding direction D1 in gaps 1g, 2g. In addition, a part of the glass 512 side (lower side in the figure) of the opposing roller 511 protrudes (intrudes) into the glass 512 side beyond nip line N1. Similarly, a portion of the glass 522 side (upper side in the figure) of the opposing roller 521 protrudes (intrudes) beyond the nip line N1 and into the glass 522 side. This arrangement brings the sheet closer to the focus position of sensors C1 and C2. The opposing rollers 511, 521 are members that serve as a background when the sensors C1, C2 read the image information of the sheet, and the outer surface is black, for example, to facilitate the edge detection of the sheet in image processing.

Between the first roller pair 501 and the glass 512 in the sheet feeding direction D1, and at the lower side of the height direction D2 with respect to the nip line N1, a glass upstream guide 513 is provided as a feeding guide to guide the bottom surface of the sheet. Between the first roller pair 501 and the opposing roller 511 in the sheet feeding direction D1, and on the upper side of the height direction D2 relative to the nip line N1, a roller upstream guide 514 is provided to guide the upper surface of the sheet. Between the second roller pair 502 and the glass 522 in the sheet feeding direction D1, and on the upper side of the height direction D2 with respect to the nip line N1, there is a glass upstream guide 523 that guides the upper surface of the sheet. Between the second roller pair 502 and the opposing roller 521 in the sheet feeding direction D1, and on the lower side of the height direction D2 relative to the nip line N1, roller upstream guides 524a, 524b are provided to guide the bottom surface of the sheet.

The roller upstream guides 514, 524a, 524b function as guides to guide the sheet tip toward the gap 1g, 2g between the opposing rollers 511, 521 and the glasses 512, 522. This prevents conveyance defects caused by the sheet tip contacting the cylindrical opposing rollers 511, 521 at a great contact angle. The downstream end of the sheet feeding direction D1 of the roller upstream guide 514 is located at the upper side of the height direction D2, at least compared to the edge of the glass 512 side of the opposing roller 511. The downstream end of the roller upstream guide 514 may be configured to slightly protrude on the downward side of the height direction D2 relative to the nip line N1, or may be configured to be located on the upward side of the nip line N1. Similarly, the downstream end of the roller upstream guide 524b in the sheet feeding direction D1 shall be located at the lower side of the height direction D2, at least compared to the glass 522-side end of the opposing roller 521. The downstream end of the roller upstream guide 524b may be configured to protrude slightly to the upper side of the height direction D2 relative to the nip line N1, or may be configured to be located to the lower side of the nip line N1.

In the example shown in the figure, the roller upstream guide 514 of the first reading portion 51 is configured with one member, but it may be configured with multiple members, such as the roller upstream guides 524a, 524b of the second reading portion 52. Also, in the example shown in the figure, the roller upstream guides 524a, 524b of the second reading portion 52 are divided into a member (524a) facing the glass upstream guide 523 and a member (524b) facing the glass 522. However, the roller upstream guides 524a, 524b may be configured as a single member, such as the roller upstream guide 514 of the first reading portion 51.

Parts (a) and part (b) of FIG. 4 show the shading correction operation of sensor C1. When shading correction is performed, the sensor C1 moves from the position shown in part (a) of FIG. 4 for reading the image information of the sheet (first position) to the position shown in part (b) of FIG. 4 (second position), that is, the position facing the lower surface of the reference plate 515. The lower surface of the reference plate 515 is white, which is the reference color, and its whiteness is controlled. The sensor C1 irradiates light to the lower surface of the reference plate 515 and measures the luminance of the reflected light to adjust the light intensity to the optimum level. For example, when the luminance of the reflected light is too high for the reference color, the light intensity is lowered, and when the luminance is too low, the light intensity is increased. This shading correction makes it possible to adjust the light intensity to the optimum level and to detect the color on the sheet with high accuracy. In the same way, the shading correction of sensor C2 slides to the position where it faces the upper surface of the reference plate 525, irradiates light onto the upper surface of the reference plate 525, and adjusts the light intensity according to the luminance of the reflected light.

(Inclined Arrangement of Glass)

Next, the arrangement of the first reading portion 51 viewed in a sheet widthwise direction (main scanning direction) is explained. Before explaining the detailed arrangement of the present embodiment, part (a), part (b) and part (c) of FIG. 13 are used to explain the arrangement of the comparative example and the conveyance defects that occur in the comparative example. As described above, in the reading apparatus that reads the image information on the sheet, it is desirable to stabilize the height of the sheet (sheet position in the depth-of-field direction) relative to the reading unit (sensor) in order to improve the image reading accuracy. However, if the sheet is actively brought into contact with the opposing member as described in the above-mentioned documents, the contact pressure between the sheet and the opposing member becomes high, which may result in a decrease in reading accuracy due to generation and accumulation of paper dust, as well as the possibility of leaving abrasion marks on the image on the sheet.

To avoid the problem of paper dust and abrasion marks, a straight path is adopted in which roller pairs 601 and 602 upstream and downstream of a reading portion are placed on the common nip line Na, as shown in part (a) of FIG. 13, and the glass 702 is placed parallel to the nip line Na. As shown in part (a) of FIG. 13, if the surface of the glass 702 on the opposing roller 703 side is far from the nip line Na, the sheet position in the height direction D2, which is the depth-of-field direction, fluctuates (flutters) significantly. If the sheet position shifts from the focus position, the accuracy of image reading will decrease and the accuracy of image quality adjustment using the adjustment unit 400 will also decrease.

For example, when using a sensor such as a CIS or CCD for color adjustment, light is irradiated onto a patch on a sheet to be measured, luminance is calculated from the light intensity of the reflected light, and the luminance is converted to density to measure the density of the patch. If the patch is measured at a position where the sheet is out of focus in the depth-of-field direction, the detected luminance will change, leading to a decrease in the accuracy of color detection. When a spectrophotometric unit is used as a reading portion, a similar decrease in detection accuracy can occur. In the image position adjustment (front-back register adjustment), if an identification sign (a patch, a mark such as a registry guide, etc. described below) is read while the image is not in focus, a gap will occur between the position of the identification sign detected from the read image information and the actual sheet position. In other words, for both color and image position adjustment, it is important to read the image information with the sheet in focus on the surface to be measured. In particular, when using a sensor of the CIS method, which is less expensive and smaller than the CCD method but has a shallower depth of field, it is desirable to maintain the sheet close enough to the focus position.

In order to suppress fluctuations in the sheet position, it is possible to increase the entering (protrusion) amount of an opposing roller 703 relative to the nip line Na, as shown in part (b) of FIG. 13, and to reduce the gap width between the opposing roller 703 and the glass 702. However, there is a concern that a large entering volume of the opposing roller 703 may cause a conveyance defect due to a large contact angle between the tip of the sheet (downstream end of sheet feeding direction D1) and the opposing roller 703. In addition, if the entering amount of the roller upstream guide 705, which guides the sheet toward the opposing roller 703, is increased to match the large entering volume of the opposing roller 703, the contact pressure between the sheet and the roller upstream guide 705 is also increased, which may cause generation and accumulation of paper dust and image scratches.

Furthermore, as another comparative example, it is possible to bring glass 702 closer to the nip line Na as shown in part (c) of FIG. 13. However, if the glass 702 is brought closer to the nip line Na with the posture parallel to the nip line Na, there is a concern that the tip of the sheet may be caught in the upstream end of the glass 702, so the glass upstream guide 704 is made to protrude more toward the nip line Na than the glass 702. In other words, the glass upstream guide 704 is configured to be closer to the nip line Na in the height direction D2 than the glass 702, or to protrude above the nip line Na in the figure.

In this case, the contact pressure between the sheet and the glass upstream guide 704 becomes large, and there is concern about generation and accumulation of paper dust and image scratches.

Therefore, other configurations that can improve image reading accuracy are desired. In particular, it is desired to prevent sheet conveyance defects and to reduce contact pressure between the sheet and the feeding guide.

Next, the arrangement of an image reading portion 500 for the present embodiment is explained using part (a), part (b) and part (c) of FIG. 5 and part (a), part (b), part (c) and part (d) of FIG. 6. Part (a), part (b) and part (c) of FIG. 5 and part (a), part (b), part (c) and part (d) of FIG. 6 show the cross section of the first reading portion 51 perpendicular to the sheet widthwise direction.

In the present embodiment, as shown in part (a) of FIG. 5, the sheet feeding path in the first reading portion 51 is made in a straight line and the glass 512 is inclined to the nip line N1. That is, the upper surface 512a, which is the upper side of the glass 512 in the height direction D2 (the side of the opposing roller 511, the second side in the present embodiment), is inclined toward the downstream of the sheet feeding direction D1 to the upper side (second side) of the height direction D2. The sensor C1 is also inclined to match the glass 512, and it is suitable to place it so that the depth-of-field direction Df1 is perpendicular to the glass 512.

To explain in more detail, the uppermost part of glass upstream guide 513, an upper surface portion 513a, is separated (evacuated) from the nip line N1 of the first roller pair 501 by a distance L1 in the downward direction D2. If the distance L1 is set to a value close to zero, the upper surface portion 513a of the glass upstream guide 513 may protrude upward beyond the nip line N1 in actual equipment due to mechanical positional variation. In such a case, the upper surface portion 513a, which has a short distance Ls1 to the first roller pair 501, intrudes into the nip line N1, and a sheet fed from the nip portion 1n of the first roller pair 501 comes into strong contact with the upper surface portion 513a of the glass upstream guide 513. As a result, there is a concern that rubbing against the upper surface portion 513a may leave rub marks on the image on the sheet. Therefore, the distance L1 should be 1 mm or more, for example, to absorb the mechanical positional variation described above. On the other hand, if the distance L1 is increased, the inclination of the glass 512 becomes unnecessarily large, so the distance L1 should be, for example, 2 mm or less.

Next, using part (b) of FIG. 5, a step between the glass upstream guide 513 and the upstream end 512b in the sheet feeding direction D1 of the upper surface 512a of the glass 512 will be explained. In the configuration where the glass upstream guide 513 is provided between the first roller pair 501 and the glass 512, the tip of the sheet can enter the gap between the glass upstream guide 513 and the glass 512 and be caught on the upstream end surface of the glass 512, causing a conveyance defect. In particular, when the tip side of the sheet is curved (curled) downward, the sheet tip is more likely to get caught.

Therefore, in order to ensure that the tip of a sheet is smoothly passed from the glass upstream guide 513 to the glass 512, the upstream end 512b of the glass 512 is located at least on the lower side (first side) of the height direction D2 compared to the upper surface portion 513a of the glass upstream guide 513. In other words, there is a step between the glass upstream guide 513 and the glass 512 such that the glass 512 is evacuated (separated) from the nip line N1 compared to the glass upstream guide 513.

The height of the step L2, which is the distance in height direction D2 between the upper surface portion 513a of the glass upstream guide 513 and the upstream end 512b of the glass 512, is set to 3 mm or more, for example, in consideration of sheets that easily curl, such as thin paper. In the configuration example shown in the figure, since the reference plate 515 is attached to the area including the upstream end 512b of the upper surface 512a of the glass 512, it is more accurate to measure the height of the step L2 with reference to the upper surface position of the reference plate 515 at the position of the upstream end 512b. By providing a step with such a height of the step L2, the possibility of a defective conveyance of a sheet Sc with a curled tip side as shown in part (c) of FIG. 5 can be reduced.

The positional relationship between an opposing roller 511 and the glass 512 is explained using part (a) of FIG. 6. The step width L3, which is the minimum width in the depth-of-field direction Df1 of the step 1g between the opposing roller 511 and the glass 512, is set to about 1 mm, for example. The step width L3 should be large enough to allow any kind of sheet to pass through, which is received from the image forming apparatus 100 to the adjustment unit 400, regardless of the variation of the step width in the actual apparatus.

In other words, it is preferable that the relationship L3>((Variation of the step width in the actual apparatus)+ (assumed maximum thickness of the sheet)) is satisfied. It is also desirable to set L3 to a small value within the range where the above relationship is satisfied, in terms of reading accuracy.

In the configuration example shown in part (a) of FIG. 6, a part of the opposing roller 511 (an edge 511a on the glass 512 side) is positioned so that it protrudes downward (glass 512 side) beyond the nip line N1 to maintain the step width L3 at approximately 1 mm. In this configuration where a part of the opposing roller 511 enters the nip line N1, the sheet fed along the nip line N1 by the first roller pair 501 comes into contact with the surface of the opposing roller 511. However, the distance Ls2 of the sheet feeding direction D1 from the nip portion 1n of the first roller pair 501 to the rotating axis of the opposing roller 511 is sufficiently large compared to the protrusion length of the opposing roller 511 (for example, ten times or more). Therefore, as shown in part (b) of FIG. 6, a sheet S is fed in a gently curved state (the curvature of the curve is small) in contact with the opposing roller 511 between the nip portions 1n and 2b of the first roller pair 501 and the second roller pair 502. As a result, the contact pressure of the sheet against the opposing roller 511 does not become large.

Part (c) of FIG. 6 is used to further explain the arrangement and dimensions of members in the present embodiment. As described above, the glass upstream guide 513 is separated (evacuated) from the nip line N1 by a distance L1 on the downward side, and the upstream end 512b of the upper surface 512a of the glass 512 is separated (evacuated) from the upper surface 513a of the glass upstream guide 513 by a step height L2 on the downward side. On the other hand, the downstream end 512c of the upper surface 512a of the glass 512 is located above the upstream end 512b in the height direction D2 and below the nip portion 2n of the second roller pair 502 in the height direction D2.

The distance in height direction D2 from the nip portion 2n to the downstream end 512c of the glass 512 (the distance from the nip line N2 of the second roller pair 502 to the downstream end 512c) is L4. The distance L4 is set to be 1 mm or more, for example, so that the sheet can be fed without coming into strong contact with the downstream end 512c, regardless of the positional variation of the downstream end 512c in the actual apparatus or thickness of the sheet.

In other words, the distance L4 is set at the same level as the distance L1 from the nip line N1 to the upper surface portion 513a of the glass upstream guide 513 and the step width L3 between the opposing roller 511 and the glass 512.

A roller pitch Lp, which is the distance between the nip portion 1n of the first roller pair 501 and the nip portion 2n of the second roller pair 502, is set to 140 mm to 175 mm according to the minimum sheet size (sheet length in sheet feeding direction) that the adjustment unit 400 can handle. For example, if a postcard size with a sheet length of 148 mm is to be used, the roller pitch Lp should be set to less than 148 mm (specifically, approximately 140 mm). In the case of a B5 size sheet with a sheet length of 182 mm, the roller pitch Lp should be set to less than 182 mm (specifically, about 175 mm).

Furthermore, the radius of each roller of the first roller pair 501 and second roller pair 502 is approximately 10 mm for an example, and the width of the sheet feeding direction D1 of the glass upstream guide 513 is approximately 20 mm for an example. In this case, the width Lg of the glass 512 in the sheet feeding direction D1 is appropriate to be 100 mm to 135 mm. When the roller pitch Lp is set to a postcard size, the width Lg is 100 mm (=140−(10+20+10)), and when the roller pitch Lp is set to a B5 size, the width Lg is 135 mm (=175-(10+20+10)).

The preferred range of an inclination angle θ of the upper surface 512a of the glass 512 (the angle between the nip line N1 and the upper surface 512a when viewed from the sheet widthwise direction) is described below. Among the ranges appropriate from each of the perspectives described above, θ becomes a small value when the width Lg of glass 512 is 135 mm and the height L2 of the step between the glass upstream guide 513 and glass 512 is 3 mm. However, assume that L1=L4. In this case, the inclination angle θ is about 1.3° from arctan (3/135). When the roller pitch Lp is set to a postcard size, Lg is 100 mm, so the inclination angle θ in this case is about 1.7° from the arctan (3/100).

In other words, it is suitable if the inclination angle θ of the upper surface 512a of the glass 512 is set to 1° or more as an example, more suitable if it is set to 1.5° or more, and even more suitable if it is set to 2° or more. If θ is set to 1.5° or more or 2° or more, the positional variation (angular variation) of the glass 512 in the actual apparatus is absorbed, and the actual inclusion angle is expected to be 1.3° or more or 1.7° or more.

On the other hand, if the inclination angle θ of the upper surface 512a of the glass 512 is too large, the large contact angle when the tip of the sheet contacts the upper surface 512a can cause conveyance defects such as curling of the tip of the sheet. In particular, when the tip side of the sheet is curved (curled) downward, a conveyance defect is likely to occur. Therefore, considering that the assumed size of the curl is that the angle of the tip portion of the sheet to the nip line N1 is 15°, and that the contact angle between the tip of the sheet and the upper surface 512a of the glass 512 should be kept to 45° or less, the inclination angle θ should be 30° or less.

In addition, a smaller inclination angle θ is preferable to prevent the occurrence of conveyance defects more certainly. Among the ranges appropriate from each of the perspectives described above, θ becomes a large value when the width Lg of the glass 512 is 50 mm and the height L2 of the step between the glass upstream guide 513 and the glass 512 is 10 mm. In this case, the inclination angle θ is approximately 11.3° from the arctan (10/50). Therefore, it is more preferable to set the inclusion angle θ to 12° or less.

The width of the glass 512, Lg, was set to be 50 mm or more so that a sensor C1 could be covered and a sheet could be fed while stabilizing its posture between it and the opposing roller 511. The height L2 of the step was set to be 10 mm or less, because if the height L2 of the step was too large, it would unnecessarily increase the inclination angle θ even though the effect of preventing the sheet tip from being caught would not be particularly improved.

As explained above, it is suitable to set the inclination angle θ of the upper surface 512a of the glass 512 to the nip line N1 to between 1° and 30°, for example, and it is more suitable to set it to between 1.5° and 12°. However, depending on the specific configuration of the image reading portion 500, it is possible to set the inclination angle θ outside this range.

A taper shape may be provided at one or both ends in the sheet feeding direction D1 of the upper surface 512a of the glass 512 for the purpose of preventing the sheet from being caught or reducing the contact pressure. In such a case, the inclination angle θ shall refer to the inclination angle of the flat area including the part facing the opposing roller 511 at the reading position of the sensor C1.

By the way, in part (c) of FIG. 6, the distance L4 of the height direction D2 from the nip portion 2n of the second roller pair 502 to the downstream end 512c of the glass 512 was explained, but as shown in part (d) of FIG. 6, the downstream end 512c is located at the lower side of the nip portion 1n of the first roller pair 501. In other words, the downstream end 512c of the glass 512 is separated (evacuated) to the downward side (first side) of the height direction D2 from both the nip lines N1 and N2 of the first roller pair 501 and the second roller pair 502. The distance of the height direction D2 from the nip line N1 of the first roller pair 501 to the downstream end 512c of the glass 512 is L5. In the configuration example shown in the figure, the nip portion 2n of the second roller pair 502 is located on the nip line N1 of the first roller pair 501, and thus L4=L5.

When nip portion 2n is not on nip line N1 (nip lines of first roller pair 501 and second roller pair 502 do not match), then L4≠L5. When nip portion 2n is lower (lower side in the figure) than nip portion 1n in height direction D2, L5>L4, and vice versa, L4<L5.

In other words, the upper surface 512a of the glass 512 does not intersect the nip line N1 of the first roller pair 501 when viewed in the sheet widthwise direction. In this way, the upper surface 512a of the glass 512 is not located at the destination where the sheet is fed from the first roller pair 501, thereby reducing the occurrence of paper dust and abrasion marks caused by the sheet coming into strong contact with the glass 512.

While the explanation above describes the arrangement and dimensions of members in the first reading portion 51, the second reading portion 52 is basically configured in the same way as the first reading portion 51, except that the positional relationship of the height direction D2 is reversed. In the case of the first reading portion 51, the nip line N1 of the first roller pair 501 is used as a reference, and the nip line of the second roller pair 502 is used as a reference, but the nip line N1 may be used as a reference if the two nip lines are considered to be identical.

The main arrangement of the second reading portion 52 is explained below. The upper surface 522a, which is the downward side (first side in the present embodiment, the side of the opposing roller 521) of the glass 522 in height direction D2, is inclined downward (first side) in height direction D1 toward the downstream of the sheet feeding direction D1. The sensor C2 is also inclined to match the glass 522, and it is suitable to arrange it so that the depth-of-field direction Df2 is perpendicular to the glass 522.

The lower surface, which is the most downward part of the glass upstream guide 523, is separated (evacuated) from the nip line of the second roller pair 502 by a distance L1 in the upward side of the height direction D2. The distance L1 should be, for example, between 1 mm and 2 mm. The upstream end of the glass 522 is located on the upper side (second side) of the height direction D2, at least compared to the lower surface of the glass upstream guide 523. In other words, there is a step between the glass upstream guide 523 and the glass 522 such that the glass 522 is evacuated (separated) from the nip line compared to the glass upstream guide 523. The height L2 of the step is set to be between 3 mm and 10 mm, for example.

The step width L3 of a step 2g between the opposing roller 521 and the glass 522 is set to approximately 1 mm, for example. By arranging the opposing roller 521 so that a part of it (the edge on the glass 522 side) protrudes upward (glass 522 side) beyond the nip line, the step width L3 is maintained at about 1 mm.

The downstream end of the lower surface of the glass 522 is located below the upstream end in height direction D2 and above a nip portion 3n of the third roller pair 503 in height direction D2. A distance L4 in height direction D2 from the nip portion 3n to the downstream end of the glass 522 is set to be 1 mm or more, for example.

The roller pitch Lp, which is the distance between the nip portion 2n of the second roller pair 502 and the nip portion 3n of the third roller pair 503, is set to about 140 mm to 175 mm according to the minimum sheet size that the adjustment unit 400 can handle. The width Lg in the sheet feeding direction D1 of the glass 522 is appropriate to be 100 mm to 135 mm.

The inclination angle θ of the lower surface of the glass 522, as an example, is suitable to be 1° or more, 1.5° or more is more suitable, and 2° or more is even more suitable. If θ is set to 1.5° or more or 2° or more, the positional variation (angular variation) of the glass 522 in the actual apparatus is absorbed, and the actual inclination angle can be expected to be 1.3° or more or 1.7° or more. On the other hand, it is suitable to set the inclination angle θ to 30° or less, and a smaller inclination angle θ is preferable to prevent the occurrence of conveyance defects more certainly. For example, it is more preferable to set the inclination angle θ to 12° or less. In other words, it is suitable to set the inclination angle θ to the nip line of the lower surface of the glass 522 to between 1° and 30°, for example, and it is more suitable to set it to between 1.5° and 12°. However, depending on the specific configuration of the image reading portion 500, it is possible to set the inclination angle θ outside this range.

(Image Position Adjustment)

The image forming system 100S of the present embodiment can adjust the execution conditions of the image forming operation performed by the image forming apparatus 100 based on the information obtained using the image reading portion 500. As an example, the operation to adjust the position of the image on both sides of the sheet (register) is described below.

FIG. 7 shows a block diagram of the system configuration of an image forming system 100S for image position adjustment. A control portion 251 of the adjustment unit 400 is connected to the printer controller 103 via a communication portion 450. The control portion 251 sends commands to one or more feeding motors M1 that drive the feeding roller pairs and to the opposing roller driving motors M2 and M3 that drive the opposing rollers 511 and 521, respectively, and controls the drive of each motor. The control portion 251 also sends commands to the flap moving motor M4 that moves the switching flap 422 and the sensor moving motor M5 that moves sensors C1 and C2 for shading correction, and controls the drive of each motor.

Furthermore, the control portion 251 detects the position of a sheet based on detection signals of sheet sensors S1 and S2, which detect the sheet, and sends commands such as the start of reading image information to the sensors C1 and C2, which are image sensors. The sheet sensor S1 is a sensor that detects the sheet upstream of the sheet feeding direction from the reading position of sensor C1, and the sheet sensor S2 is a sensor that detects the sheet downstream of the reading position of sensor C1 and upstream of the reading position of sensor C2. The image processing portion 330 processes the image information read by the sensors C1 and C2 to obtain information (such as data representing the amount of correction of the image position) to send to the printer controller 103.

Part (a) of FIG. 8 is an example of a screen displayed on the operation unit 180, which is the paper library screen 1001 showing a list of information for each sheet used as a recording material (paper library 900 in FIG. 8). When a user selects one of the columns 910 representing the information of each sheet and touches the button 1002 of "Image Position Adjustment" in part (a) of FIG. 8, the screen for selecting the correction method for image position adjustment shown in part (b) of FIG. 8 is displayed. When the user further operates the button 1105 of "Adjust by reading a test page," the printer controller 103 accepts the request to perform automatic image positioning for the selected sheet. In this case, the printer controller 103 causes the engine control portion 312 to start outputting the measurement test patterns 802 and 803 for image position adjustment shown in part (a) and part (b) of FIG. 9 on both sides of the selected sheet. The test patterns 802 and 803 are rectangular patch images 820 placed at the four corners of the sheet as identification marks.

After the test patterns for measurement are formed on both sides of the sheet, the sheet is passed from the image forming apparatus 100 to the adjustment unit 400. In the image reading portion 500 of the adjustment unit 400, the sheet is fed by the first roller pair 501, the second roller pair 502, and the third roller pair 503, and the image information on the first and second sides is read by the sensors C1 and C2 in parallel.

An image processing unit 330 (FIG. 7) of the adjustment unit 400 obtains information to be sent to the printer controller 103 based on the image information read by the sensors C1 and C2. In other words, the line images read by the sensors C1 and C2 are stitched together in the sub-scanning direction (sheet feeding direction) to form a two-dimensional image data, and the edge of the sheet and the patch image 820 are detected in the image data. Then, based on the coordinates of the patch image 820 and the coordinates of the corners of the sheet, the dimensions of the sheet ((A), (B) of part (a) and part (b) of FIG. 9) and the distance from the patch image 820 to the edge of the sheet ((C) to (I)) are detected. In part (a) and part (b) of FIG. 9, the coordinates of the corner of the sheet are represented by (Xm1, Ym1) and (Xm2, Ym2) as m=0, 1, 2, 3, and the coordinates of the patch image 820 are represented by (Xm1, Ym1) and (Xm2, Ym2) as m=4, 5, 6, 7. The coordinate axes represent the axis of the main scanning direction of the image reading portion 500 as the X-axis and the axis of the secondary scanning direction (sheet feeding direction) as the Y-axis.

Based on the values in (A) through (I), the image processing portion 330 detects image distortion and image misalignment relative to the sheet, and calculates geometric adjustment values as parameters for correcting them.

Examples of geometric adjustment parameters are the lead position, which defines the start position of the image in the sub-scanning direction (sheet feeding direction), the side position, which defines the start position of the image in the main scanning direction (sheet widthwise direction), and the magnification of the image scaling. Other examples of geometric adjustment parameters are the right angle, which deforms the image to match the non-rectangularity of the sheet (the degree of parallelogram or trapezoidal distortion relative to an ideal rectangle), and the amount of rotation of the image.

The geometric adjustment values calculated by the image processing portion 330 are stored in the paper library 900 in the image forming apparatus 100 through the communication portion 450. When the printer controller 103 executes an image forming operation based on a user job, it reads the geometric adjustment values corresponding to the sheet to be used for the current image forming operation from the paper library 900, and executes the shape correction based on the geometric adjustment values in the image shape correction portion 320. Then, by executing the image forming operation by the engine control portion 312 based on the image data after the shape correction, it is possible to output an image in which the misalignment and distortion of the image have been corrected.

Here, a case in which image position adjustment is performed based on explicit instructions from a user has been described. However, the image position adjustment using the test patterns 802 and 803 for measurement may be performed autonomously, for example, at a timing when the printer controller 103 determines that calibration is necessary. For example, the image position adjustment may be automatically started when a user job is submitted as a process prior to outputting the deliverables, or the image position adjustment may be automatically inserted at a predetermined timing during the execution of the user job.

The geometric adjustment value is one example of setting the execution conditions of the image forming operation performed by the image forming apparatus 100, and other color adjustments may be made, for example, using the adjustment unit 400. As an example, when the printer controller 103 receives a request for color adjustment through the operation of the operation unit 180, it makes the image forming apparatus 100 output a test chart in which color patches are arranged in a predetermined pattern. The adjustment unit 400 reads the density of each patch using the image reading portion 500, and feeds back the correction value of density to the image forming apparatus 100 based on the read density value. The setting of the execution condition of the image forming operation that is changed in the case of color tone adjustment is, for example, the gamma value of the look-up table that shows the relationship between the image data and the exposure amount of the laser scanner portion 107. Similar to the image position adjustment, the color tone adjustment may be performed autonomously, for example, at a timing when the printer controller 103 determines that calibration is necessary.

(Control Flow)

Next, control flow of the image position adjustment using the image forming apparatus 100 and the adjustment unit 400 described above is described according to the flowchart in FIG. 10 with reference to the block diagram in FIG. 7 and part (a) and part (b) of FIG. 11 and part (a) and part (b) of FIG. 12. Each process in this flowchart is performed by the printer controller 103 reading the program from the memory device, executing it, and sending instructions to the engine control portion 312 and the control portion 251 of the adjustment unit 400 (FIG. 7) as necessary.

When a user requests an instruction to execute an image forming operation (user job) that requires output of deliverables from the user (S01: Y), each member of the image forming apparatus 100 and the adjustment unit 400 is made to wait at the home position (HP). At this time, the switching flap 422 of the adjustment unit 400 waits in the upward position (the position shown in part (a) of FIG. 11) to guide a sheet S to the through path 431 (S02). Then, the image forming apparatus 100 performs image formation on the sheet S (S03), and the sheet S is fed to the adjustment unit 400 as shown in part (a) of FIG. 11 (S04). After that, the sheet S is fed through the through path 431 by each roller pair (401, 501, 502, 503, 406) of the through path 431, and is passed to the finisher 600, which is a downstream device, as shown in part (b) of FIG. 11, and is stacked in the tray of the finisher 600 (S05). When the above process is repeated until the last sheet of the job (S06), the job is finished.

On the other hand, when a job for image position adjustment is entered by pressing a button 1105 in part (b) of FIG. 9 (S01: N), each member of the image forming apparatus 100 and the adjustment unit 400 is made to wait in the home position (HP). At this time, the switching flap 422 of the adjustment unit 400 waits in the downward position (the position shown in part (a) of FIG. 12) to guide the sheet S to the discharge path 432 (S10). In preparation for reading the image information, the light intensity is optimized by the shading correction operation of sensors C1 and C2 (S10). After that, test patterns 802, 803 (part (a) and part (b) of FIG. 8) for measurement are formed on the sheet S (S11), and the sheet S is transported to the adjustment unit 400 (S12).

As shown in part (a) of FIG. 12, the sheet S transported to the adjustment unit 400 passes through the image reading portion 500, where the image information on the first and second sides of the sheet S is read, and the misalignment of the patch image 820 on the sheet and the shape of the sheet S are measured (S13). In this process, the sensor C1 starts reading at the timing when a predetermined time has elapsed on the timer after the tip of the sheet S passes through the sheet sensor S1. The sensor C2 starts reading at the timing when a predetermined time has elapsed on the timer after the tip of the sheet S passes through the sheet sensor S2. Based on the read image information, the image processing portion 330 calculates the geometric adjustment value, which is notified to the image forming apparatus 100 through the communication portion 250 and stored in the paper library 900 to complete the image position adjustment (S14). Then, as shown in part (b) of FIG. 12, the sheet S is fed by the switching flap 422 to the discharge path 432 and discharged to the discharge tray 430 (S15). When the above process is repeated until the last sheet of the job (S06), the job is finished.

In the present embodiment, the automatic adjustment operation using the adjustment unit 400 is described using image position adjustment (front and back registration) as an example, but the same operation is basically performed for color adjustment. In this case, the image for measurement is changed from a pattern for position detection (802, 803) as shown in part (a) and part (b) of FIG. 9 to a chart for color adjustment in which patch images with gradation are arranged.

OTHER EMBODIMENTS

Although the above embodiment describes a configuration in which a CIS is employed as the reading portion, a CCD image sensor that includes a reduced optical system with multiple mirrors and a charge-coupled device as the light receiving element may be used as the reading portion. In addition, a spectrophotometer that includes a diffraction grating that breaks down the reflected light from the sheet into wavelengths and a photo-detector that measures the light intensity for each wavelength may be used as a reading portion.

Furthermore, the image information read by a reading portion may be used for purposes other than adjusting the execution conditions of the image formation operation. For example, the image information read by the reading portion may be compared with the image data used for image formation to perform product inspection (control of image quality and detection of image defects).

Moreover, although the above embodiment illustrates opposing rollers 511 and 521 as an example of an opposing member, the opposing member may be, for example, a guiding member in the form of a plate. Such a guiding member may be urged toward the glass 512, 522 by a spring member.

Furthermore, in the above embodiment, a reading apparatus that is connected to an image forming apparatus is described, but this technology may be applied to a reading apparatus that is placed in a common casing with the image forming apparatus. In other words, the image forming system may be a unitized system in which a part equipped with an image forming function and a part equipped with a reading function are combined into a single device. For example, a reading portion 200 similar to the first reading portion 51 of the above embodiment may be provided in the reverse portion 136 of FIG. 1. In addition, this technology may be applied not only to a reading apparatus that reads sheets formed by an image forming apparatus, but also to a document reading apparatus that reads image information from a document.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-010831 filed on Jan. 27, 2021, which is hereby incorporated by reference herein in its entirety.

What is claimed is:

1. A reading apparatus for reading an image information of a sheet on which an image is formed by an image forming apparatus, said reading apparatus comprising:
    a first roller pair configured to feed the sheet in a sheet feeding direction;
    a second roller pair disposed downstream of said first roller pair in the sheet feeding direction and configured to feed the sheet, said second roller pair being disposed to overlap with a nip line passing through a nip portion of said first roller pair and extending in the sheet feeding direction as seen from a sheet widthwise direction perpendicular to the sheet feeding direction;
    a transmitting member disposed between said first roller pair and said second roller pair in the sheet feeding direction and on a first side in a height direction perpendicular to the sheet feeding direction and the sheet widthwise direction with respect to the nip line, and configured to transmit a light:
    a reading portion configured to read the image information of the sheet, fed from said first roller pair toward said second roller pair, through said transmitting member; and
    an opposing member disposed on a second side opposite to the first side in the height direction with respect to said transmitting member and configured to oppose said reading portion through said transmitting member,
    wherein, as seen in the sheet widthwise direction, a surface of the second side of said transmitting member in the height direction is inclined, with respect to the nip line, to the second side in the height direction toward downstream of the sheet feeding direction.

2. A reading apparatus according to claim 1, wherein an inclination angle of the surface to the nip line is 1° or more, and 30° or less.

3. A reading apparatus according to claim 1, wherein an inclination angle of the surface to the nip line is 1.5° or more, and 12° or less.

4. A reading apparatus according to claim 1, wherein, as seen in the sheet widthwise direction, a downstream end of the surface with respect to the sheet feeding direction is positioned at the first side in the height direction with respect to the nip line.

5. A reading apparatus according to claim 1, wherein, as seen in the sheet widthwise direction, a downstream end of the surface with respect to the sheet feeding direction is positioned at the first side in the height direction with respect to a nip line passing through a nip portion of said second roller pair and extending in the sheet feeding direction.

6. A reading apparatus according to claim 1, further comprising:
    a feeding guide disposed between said first roller pair and said transmitting member in the sheet feeding direction and on the first side in the height direction with respect to the nip line, and configured to guide the sheet,
    wherein, as seen in the sheet widthwise direction, said feeding guide does not project toward the second side in the height direction with respect to the nip line.

7. A reading apparatus according to claim 6, wherein an upstream end of the surface of said transmitting member with respect to the sheet feeding direction is positioned at the more first side in the height direction than a portion of the most second side of said feeding guide.

8. A reading apparatus according to claim 6, wherein the upstream end of the surface with respect to the sheet feeding direction is positioned at the first side within a range of 3 mm or more and 10 mm or less in the height direction than a portion of the most second side of said feeding guide, and
    wherein the downstream end of the surface with respect to the sheet feeding direction is positioned at the second side of the upstream end in the height direction and at the first side with respect to the nip line.

9. A reading apparatus according to claim 1, wherein a part of said opposing member is configured to form a gap allowing the sheet to pass between itself and said transmitting member and project toward the first side from the second side in the height direction with respect to the nip line, and
    wherein the gap between said opposing member and said transmitting member is positioned at the first side in the height direction with respect to the nip line.

10. A reading apparatus according to claim 1, wherein said opposing member includes a roller for rotating about an axis extending in the sheet widthwise direction.

11. A reading apparatus according to claim 1, further comprising a reference portion provided on a surface of said transmitting member at a different position of said opposing member with respect to the sheet feeding direction, and configured to perform a shading correction of said reading portion,
    wherein said reading portion is movable between a first position where the image information is read from the sheet fed between said opposing member and said transmitting member and a second position where said reference portion is read to perform the shading correction.

12. A reading apparatus according to claim 1, wherein said transmitting member, said reading portion and said opposing member are a first transmitting member, a first reading portion and a first opposing member, respectively, and said reading apparatus further includes
    a third roller pair disposed downstream of said second roller pair in the sheet feeding direction and configured to feed the sheet, said third roller pair being disposed to overlap with the nip line passing through the nip portion of said first roller pair and extending in the sheet feeding direction as seen from the sheet widthwise direction;
    a second transmitting member disposed between said second roller pair and said third roller pair in the sheet feeding direction and on the second side in the height direction with respect to the nip line, and configured to transmit the light:
    a second reading portion configured to read the image information of the sheet, fed from said second roller pair toward said third roller pair, through said second transmitting member; and
    a second opposing member disposed on the first side in the height direction with respect to said second transmitting member and configured to oppose said second reading portion through said second transmitting member,
    wherein, as seen in the sheet widthwise direction, a surface of the first side of said second transmitting member in the height direction is inclined to the first side in the height direction toward downstream of the sheet feeding direction.

13. A reading apparatus according to claim 12, wherein an inclination angle of the surface of the first side of said second transmitting member in the height direction to the nip line is 1° or more, and 30° or less.

14. An image forming system includes an image forming apparatus for forming an image on a sheet, and a reading apparatus for reading an image information of the sheet on which the image is formed by said image forming apparatus, said reading apparatus comprising:
- a first roller pair configured to feed the sheet in a sheet feeding direction;
- a second roller pair disposed downstream of said first roller pair in the sheet feeding direction and configured to feed the sheet, said second roller pair being disposed to overlap with a nip line passing through a nip portion of said first roller pair and extending in the sheet feeding direction as seen from a sheet widthwise direction perpendicular to the sheet feeding direction;
- a transmitting member disposed between said first roller pair and said second roller pair in the sheet feeding direction and on a first side in a height direction perpendicular to the sheet feeding direction and the sheet widthwise direction with respect to the nip line, and configured to transmit a light:
- a reading portion configured to read the image information of the sheet, fed from said first roller pair toward said second roller pair, through said transmitting member; and
- an opposing member disposed on a second side opposite to the first side in the height direction with respect to said transmitting member and configured to oppose said reading portion through said transmitting member,
- wherein, as seen in the sheet widthwise direction, a surface of the second side of said transmitting member in the height direction is inclined, with respect to the nip line, to the second side in the height direction toward downstream of the sheet feeding direction.

15. A reading apparatus according to claim 14, wherein an inclination angle of the surface to the nip line is 1° or more, and 30° or less.

* * * * *